United States Patent
Uekita et al.

[11] Patent Number: 5,171,829
[45] Date of Patent: Dec. 15, 1992

[54] COPOLYMERIC AND AMPHIPHILIC POLYIMIDE PRECURSOR, PROCESS FOR PREPARING THE SAME AND THIN FILM

[75] Inventors: Masakazu Uekita; Hiroshi Awaji, both of Kobe, Japan

[73] Assignee: Kanegafuchi Kagaku Kogyo Kabushiki Kaisha, Osaka, Japan

[21] Appl. No.: 642,255

[22] Filed: Jan. 16, 1991

Related U.S. Application Data

[62] Division of Ser. No. 41,275, Apr. 22, 1987, Pat. No. 4,987,219.

[30] Foreign Application Priority Data

Apr. 25, 1986 [JP] Japan .................. 61-97568

[51] Int. Cl.$^5$ .................. C08C 69/26; C08C 73/10; B32B 27/00
[52] U.S. Cl. .................. 528/353; 528/26; 528/125; 528/128; 528/171; 528/172; 528/173; 528/176; 528/188; 528/220; 528/229; 528/335; 528/337; 528/341; 528/342; 528/348; 528/350; 528/352; 525/436; 428/473.5; 428/411.1; 428/220
[58] Field of Search .................. 528/26, 76, 125, 128, 528/188, 341–342, 350, 348, 220, 229, 271, 272, 352, 353, 171–173, 335, 188, 337; 428/473.5, 411.1, 220; 525/436

[56] References Cited

U.S. PATENT DOCUMENTS

| | | | |
|---|---|---|---|
| 4,454,276 | 6/1984 | Uda et al. | 528/353 |
| 4,822,853 | 4/1989 | Uekita et al. | 528/353 |
| 4,868,281 | 9/1989 | Uekita et al. | 528/353 |
| 4,910,293 | 3/1990 | Uekita et al. | 528/353 |
| 4,943,471 | 7/1990 | Uekita et al. | 528/353 |
| 4,962,985 | 10/1990 | LeGrange | 528/353 |
| 4,978,573 | 12/1990 | Kohn | 528/353 |
| 4,988,795 | 1/1991 | Uekita et al. | 528/353 |
| 5,043,248 | 8/1991 | Uekita et al. | 578/353 |

*Primary Examiner*—John Kight, III
*Assistant Examiner*—P. Hampton-Hightower
*Attorney, Agent, or Firm*—Armstrong & Kubovcik

[57] ABSTRACT

A copolymeric amphiphilic polyimide precursor having the recurring unit of the formula (1):

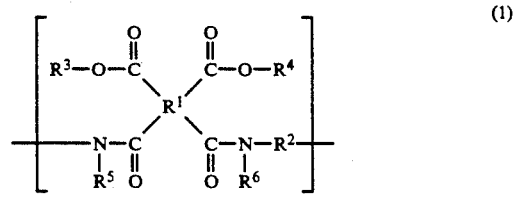

wherein $R^1$ is a tetravalent group having at least 2 carbon atoms, $R^2$ is a bivalent group having at least 2 carbon atoms, and $R^3$, $R^4$, $R^5$ and $R^6$ are hydrogen atom or a monovalent group having 1 to 30 carbon atoms selected from the group consisting of an aliphatic group, an alicyclic group, an aromatic group, a group in which an aliphatic group is combined with an aromatic group, or an alicyclic group, and their groups substituted by a halogen atom, nitro group, amino group, cyano group, methoxy group or acetoxyl group, provided that at least one of $R^3$, $R^4$, $R^5$ and $R^6$ is neither hydrogen atom nor the above-mentioned group which has 1 to 11 carbon atoms; a part of at least one of said $R^1$ and said $R^2$ being substituted with a group having a valence different therefrom. The precursor of the present invention can provided thin films by the LB technique, and by ring closure of the obtained LB films, there can be obtained ultrathin films having excellent heat resistance, electric properties, chemical resistance and mechanical properties, and having a thickness of not more than 10,000 Å, and if desired, a thickness of 10 to 1,000 Å. Further, according to the process of the invention, polyimide thin films having a wide range of properties can be easily prepared. When a part of the group $R^2$ is substituted with a trivalent or tetravalent group, the heat resistance can be improved since a ring having better heat resistance than an imide ring is formed.

14 Claims, 13 Drawing Sheets

COPOLYMERIC AND AMPHIPHILIC POLYIMIDE PRECURSOR, PROCESS FOR PREPARING THE SAME AND THIN FILM

This is a division of application Ser. No. 041,275 filed Apr. 22, 1987 now U.S. Pat. No. 4,987,219.

BACKGROUND OF THE INVENTION

The present invention relates to a copolymeric and amphiphilic precursor of polyimide, a process for the preparation thereof, and thin films, and more particularly to a copolymeric amphiphilic polyimide precursor modified so as to form a film by the Langmuir-Blodgett technique.

In the 1930s, it was found by Langmuir and Blodgett that a fatty acid having 16 to 22 carbon atoms could form a monolayer (monomolecular film) on the surface of water and the monolayers could be built up on a substrate to form a multilayer film. In recent years, various studies have been made on the applications of the built-up films, namely Langmuir-Blodgett films (hereinafter referred to as "LB film"). The LB films of the straight-chain saturated fatty acids are poor in heat resistance and mechanical strength and are not suitable for practical uses. In order to solve the above problem, there are proposed, for instance, polymerizing films formed from unsaturated fatty acids such as ω-tricosenoic acid, ω-heptadecenoic acid and α-octadecylacrylic acid, or unsaturated fatty acid esters such as vinyl stearate and octadecyl acrylate. However, these films are insufficient in heat resistance and other properties.

On the other hand, it is well known that films of polyimide have excellent heat resistance. The thickness of the films prepared, for instance, by spin coating is at least 1,000 Å, usually 1 μm or more. It is very difficult to form a heat resistant polyimide film with a thickness of less than 1,000 Å and with no pin-hole.

It is an object of the present invention to provide an LB film having improved heat resistance, chemical resistance, mechanical properties such as adhesion and good insulation properties.

A further object of the present invention is to provide a material capable of providing a heat resistant ultrathin film.

A still further object of the present invention is to provide ultrathin films of copolymeric polyimides.

These and other objects of the present invention will became apparent from the description hereafter.

SUMMARY OF THE INVENTION

The present inventors found, as described in a copending application Ser. No. 885,666 that a polyamide acid can form a film by introducing substituent groups for imparting the hydrophobic property to a polyamide acid into the polyamide acid by means of Langmuir-Blodgett technique, and ultrathin polyimide films with heat resistance over 400° C. can be produced by imidizing the multilayer films of the so modified polyamide acid.

In accordance with the present invention, there is provided a copolymeric amphiphilic polyimide precursor having the recurring unit of the formula (1):

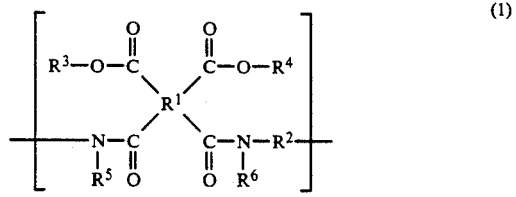

wherein $R^1$ is a tetravalent group having at least 2 carbon atoms, $R^2$ is a bivalent group having at least 2 carbon atoms, and $R^3$, $R^4$, $R^5$ and $R^6$ are hydrogen atom or a monovalent group having 1 to 30 carbon atoms selected from the group consisting of an aliphatic group, an alicyclic group, an aromatic group, a group in which an aliphatic group is combined with an aromatic group or an alicyclic group, and their groups substituted by a halogen atom, nitro group, amino group, cyano group, methoxyl group or acetoxyl group, provided that at least one of $R^3$, $R^4$, $R^5$ and $R^6$ is neither hydrogen atom nor the above-mentioned group which has 1 to 11 carbon atoms; a part of at least one of said $R^1$ and $R^2$ being substituted with a group having a valence different therefrom.

Examples of the copolymeric and amphiphilic polyimide precursors of the invention are as follows:

The copolymeric and amphiphilic polyimide precursor of the invention having a recurring unit of the formula (2):

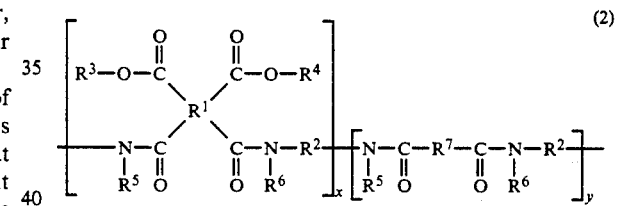

wherein $R^7$ is a bivalent group having at least 2 carbon atoms, x and y represent a ratio satisfying the equations of $0<x<1$, $0<y<1$ and $x+y=1$, and $R^1$, $R^2$, $R^3$, $R^4$, $R^5$ and $R^6$ are as defined above; is prepared by a process in which a tetracarboxylic acid dianhydride of the formula (10):

wherein $R^1$ is as defined above, is reacted with $R^3OH$ and $R^4OH$ wherein $R^3$ and $R^4$ are as defined above, the resulting compound of the formula (11):

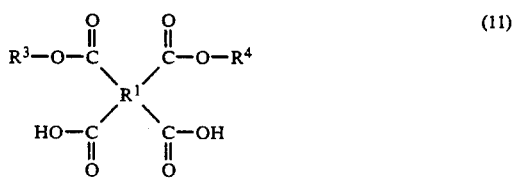

wherein $R^1$, $R^3$ and $R^4$ are as defined above and a compound of the formula (12):

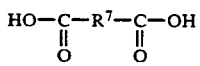  (12)

wherein $R^7$ is as defined above, are converted into acid halides in a substantially anhydrous polar organic solvent at a temperature of not lower than $-10°$ C., and the acid halides are reacted with a compound of the formula (15):

$$R^5-NH-R^2-NH-R^6 \quad (15)$$

wherein $R^2$, $R^5$ and $R^6$ are as defined above, at a temperature of not lower than $-10°$ C.

The copolymeric and amphiphilic polyimide precursor of the invention having a recurring unit of the formula (3):

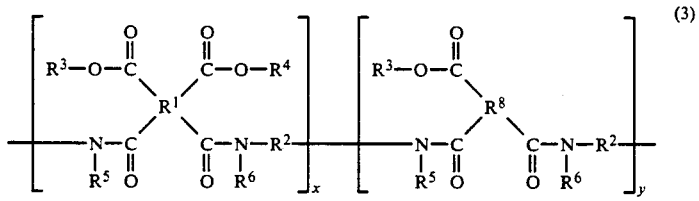  (3)

wherein $R^8$ is a trivalent group having at least 2 carbon atoms, and $R^1$, $R^2$, $R^3$, $R^4$, $R^5$, $R^6$, x and y are as defined above; is prepared by a process in which a tetracarboxylic acid dianhydride of the formula (10):

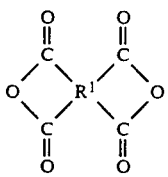  (10)

wherein $R^1$ is as defined above is reacted with $R^3OH$ and $R^4OH$ wherein $R^3$ and $R^4$ are as defined above, to produce a compound of the formula (11):

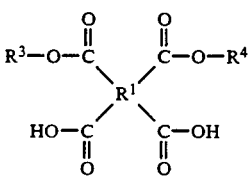  (11)

wherein $R^1$, $R^3$ and $R^4$ are as defined above, a tricarboxylic acid anhydride having the formula (13):

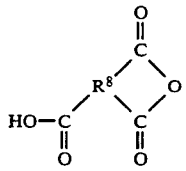  (13)

wherein $R^8$ is as defined above, is reacted with $R^3OH$ wherein $R^3$ is as defined above to produce a compound having the formula (14):

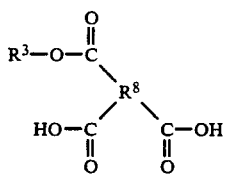  (14)

wherein $R^3$ and $R^8$ are as defined above, the compound (11) and the compound (14) are converted into acid halides in a substantially anhydrous polar organic solvent at a temperature of not lower than $-10°$ C., and the acid halides are reacted with a compound of the formula (15):

$$R^5-NH-R^2-NH-R^6 \quad (15)$$

wherein $R^2$, $R^5$ and $R^6$ are as defined above at a temperature of not lower than $-10°$ C.

The copolymeric and amphiphilic polyimide precursor of the invention having a recurring unit of the formula (4):

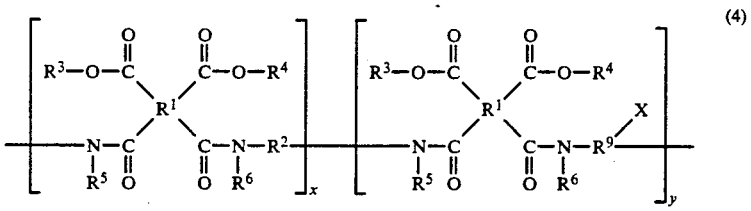  (4)

wherein $R^9$ is a trivalent group having at least 2 carbon atoms, X is a substituent group of $R^9$, and $R^1$, $R^2$, $R^3$, $R^4$, $R^5$, $R^6$, x and y are as defined above; is prepared by a process in which a tetracarboxylic acid dianhydride of the formula (10):

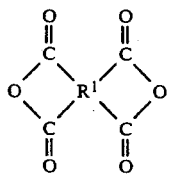

wherein $R^1$ is as defined above is reacted with $R^3OH$ and $R^4OH$ wherein $R^3$ and $R^4$ are as defined above, the resulting compound of the formula (11):

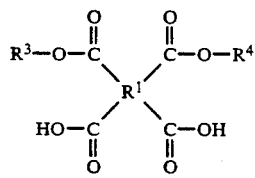

wherein $R^1$, $R^3$ and $R^4$ are as defined above, is converted into an acid halide in a substantially anhydrous polar organic solvent at a temperature of not lower than $-10°$ C., and the acid halide is reacted with a compound of the formula (15):

$$R^5-NH-R^2-NH-R^6 \quad (15)$$

wherein $R^2$, $R^5$ and $R^6$ are as defined above and a compound of the formula (16):

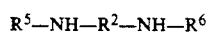

wherein $R^5$, $R^6$, $R^9$ and X are as defined above at a temperature of not lower than $-10°$ C.

The copolymeric and amphiphilic polyimide precursor of the invention having a recurring unit of the formula (5):

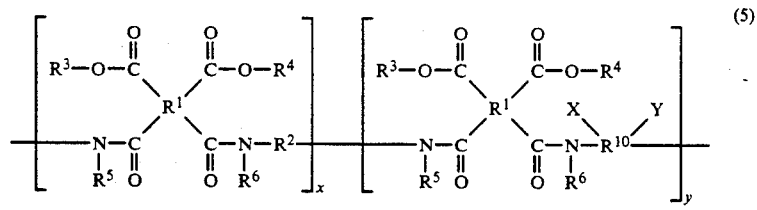

wherein $R^{10}$ is a tetravalent group having at least 2 carbon atoms, X and Y are substituent groups of $R^{10}$, and $R^1$, $R^2$, $R^3$, $R^4$, $R^5$, $R^6$, x and y are as defined above; is prepared by a process in which a tetracarboxylic acid dianhydride of the formula (10):

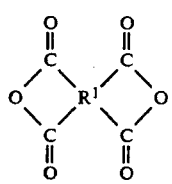

wherein $R^1$ is as defined above is reacted with $R^3OH$ and $R^4OH$ wherein $R^3$ and $R^4$ are as defined above, the resulting compound of the formula (11):

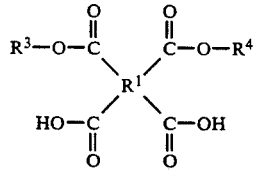

wherein $R^1$, $R^3$ and $R^4$ are as defined above, is converted into an acid halide in a substantially anhydrous polar organic solvent at a temperature of not lower than $-10°$ C. and the acid halide is reacted with a compound of the formula (15):

$$R^5-NH-R^2-NH-R^6 \quad (15)$$

wherein $R^2$, $R^5$ and $R^6$ are as defined above, and a compound of the formula (17):

wherein $R^5$, $R^6$, $R^{10}$, X and Y are as defined above at a temperature of not lower than $-10°$ C.

The copolymeric and amphiphilic polyimide precursor of the invention having a recurring unit of the formula (19):

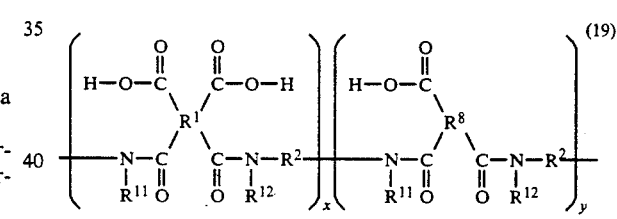

wherein $R^{11}$ and $R^{12}$ are hydrogen atom or a monovalent group having 1 to 30 carbon atoms selected from the group consisting of an aliphatic group, an alicyclic group, an aromatic group, a group in which an aliphatic group is combined with an aromatic group or alicyclic group, and their groups substituted by a halogen atom, nitro group, amino group, cyano group, methoxyl group or acetoxyl group, provided that at least one of $R^{11}$ and $R^{12}$ is neither hydrogen atom nor the above-mentioned group which has 1 to 11 carbon atoms, and $R^1$, $R^2$, $R^8$, x and y are as defined above; is prepared by a process in which a tetracarboxylic acid dianhydride of the formula (10):

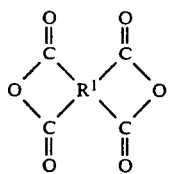

(10)

wherein R¹ is as defined above and a compound of the formula (13'):

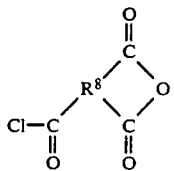

(13')

wherein R⁸ is as defined above are reacted with a compound of the formula (18):

R¹¹—NH—R²—NH—R¹² (18)

wherein R², R¹¹ and R¹² are as defined above at a temperature of not higher than 50° C.

The copolymeric and amphiphilic polyimide precursor of the invention having a recurring unit of the formula (21):

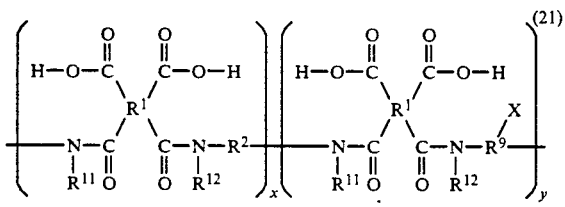

(21)

wherein R¹, R², R⁹, R¹¹, R¹², X, x and y are as defined above is prepared by a process in which a tetracarboxylic acid dianhydride of the formula (10):

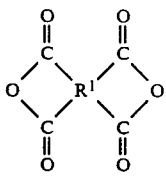

(10)

wherein R¹ is as defined above and a compound of the formula (18):

R¹¹—NH—R²—NH—R¹² (18)

wherein R², R¹¹ and R¹² are as defined above are reacted with a compound of the formula (20):

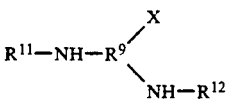

(20)

wherein R⁹, R¹¹ and R¹² are as defined above at a temperature of not higher than 50° C.

The copolymeric and amphiphilic polyimide precursor of the invention having a recurring unit (23):

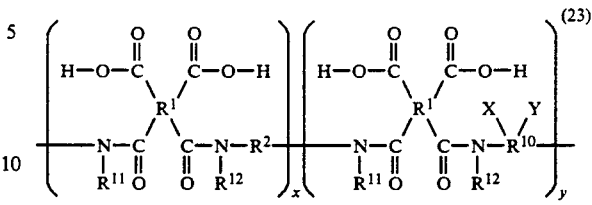

(23)

wherein R¹, R², R¹⁰, R¹¹, R¹², X, Y, x and y are as defined above is prepared by a process in which a tetracarboxylic acid dianhydride of the formula (10):

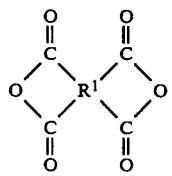

(10)

wherein R¹ is as defined above and a compound of the formula (18):

R¹¹—NH—R²—NH—R¹² (18)

wherein R², R¹¹ and R¹² are as defined above are reacted with a compound of the formula (22):

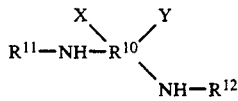

(22)

wherein R¹⁰, R¹¹, R¹², X and Y are as defined above at a temperature of not higher than 50° C.

DETAILED DESCRIPTION

Figure 1:
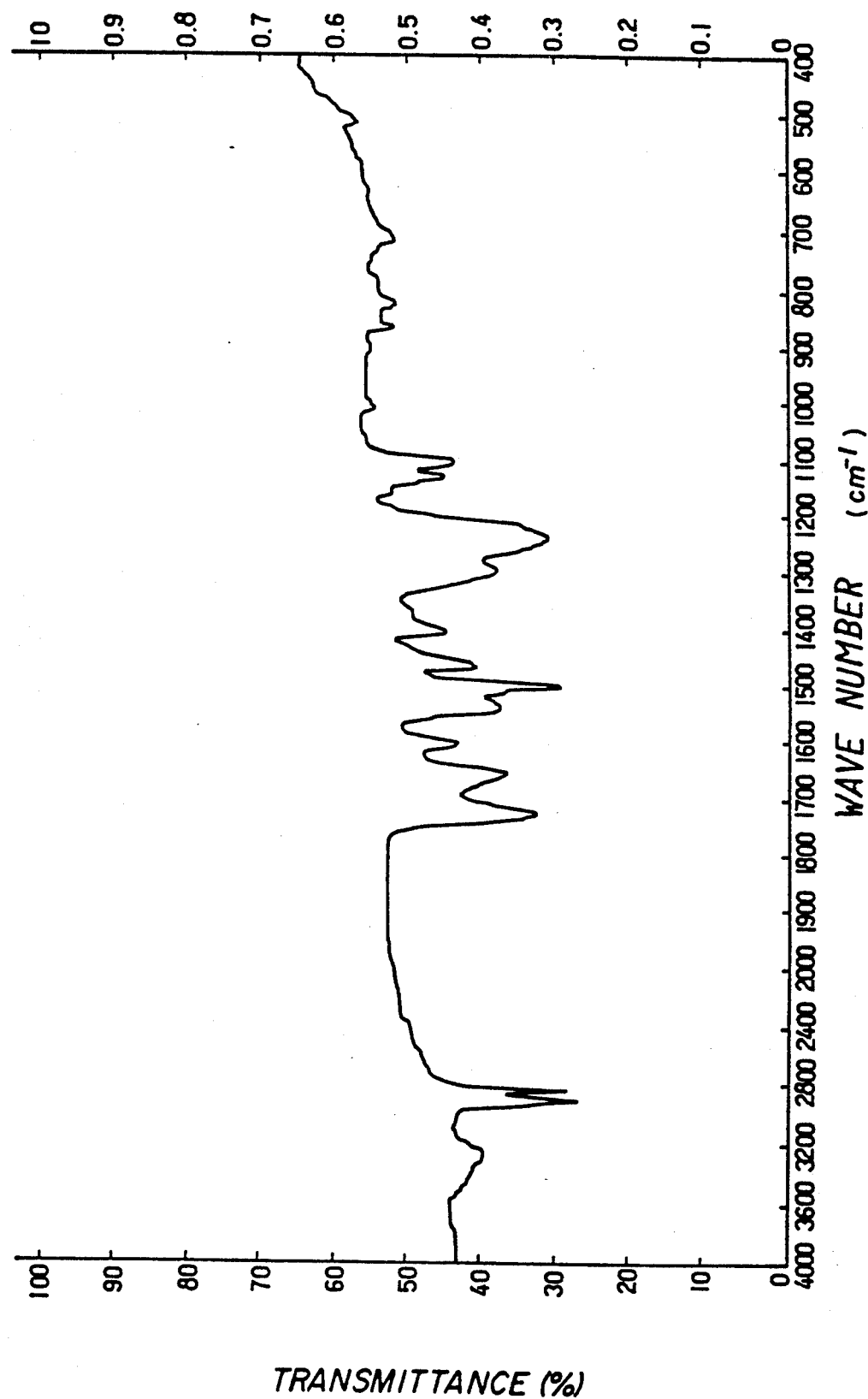
FIG. 1 is an infrared absorption spectrum (hereinafter referred to as "IR absorption spectrum") of the copolymeric and amphiphilic polyimide precursor of the present invention obtained in Example 1 described after.

The copolymeric and amphiphilic polyimide precursors of the present invention are polymers having the recurring unit of the formula (1):

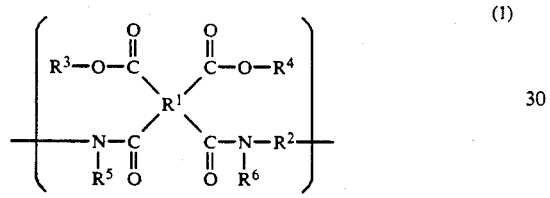

wherein the groups $R^1$ to $R^6$ are as defined above, and a part of at least one of $R^1$ and $R^2$ is substituted with a group having a valence different therefrom, and having a number average molecular weight of 2,000 to 300,000, preferably from 10,000 to 150,000. When the number average molecular weight is outside the above range, the precursor has a tendency that the strength of the film prepared therefrom is too low, or that the viscosity thereof is too high and accordingly the procedure for forming LB films becomes difficult.

In the formula (1), $R^1$ is a tetravalent group having at least two carbon atoms, preferably from 5 to 20 carbon atoms. It may be an aromatic group; an alicyclic group; a aliphatic group; a group wherein an aromatic group and an aliphatic group are combined; a group wherein each of the above-mentioned groups is substituted by a monovalent group having 1 to 30 carbon atoms selected from the group consisting of an aliphatic group, an alicyclic group, an aromatic group, and a group in which an aliphatic group is combined with an aromatic group or alicyclic group; or a group wherein each of the preceding groups is substituted by a monovalent group such as a halogen atom, nitro group, amino group, cyano group, methoxyl group or acetoxyl group, or by a group in which the above monovalent group bonds to —O—, —COO—, —NHCO—, —CO—, —S—, —CSS—, —NHCS—, —CS—, or the like. Groups characterized by benzenoid unsaturation having at least 6 carbon atoms are preferred as $R^1$ in points of heat resistance, chemical resistance and mechanical properties.

Representative examples of the group $R^1$ are, for instance,

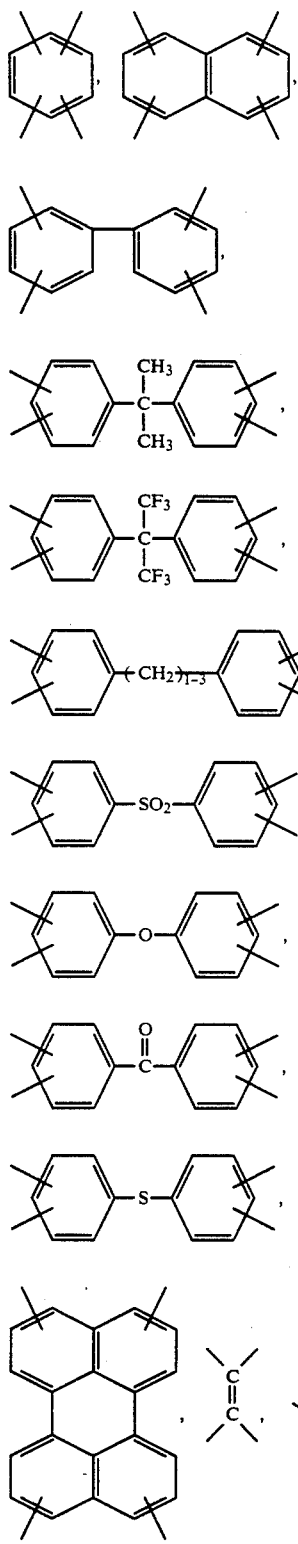

or the like.

The term "benzenoid unsaturation" as used herein is a technical term used in contradistinction to the quinoid structure, as shown below, and means structures same as those of carbon rings included in usual aromatic compounds.

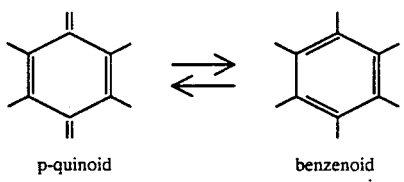

p-quinoid      benzenoid unsaturation

The positions of four bonds of the group $R^1$, that is to say, the positions of the bonds linking

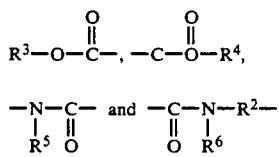

to $R^1$ in the recurring unit (1), are not particularly limited. However, it is preferable that each two of these four bonds are present at adjacent two carbon atoms constituting the group $R^1$, since a five-membered or six-membered ring is easy to be formed when a film formed from the copolymeric polyimide precursor is ring-closed.

Preferable examples of the group $R^1$ as mentioned above are, for instance,

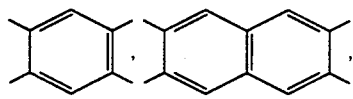

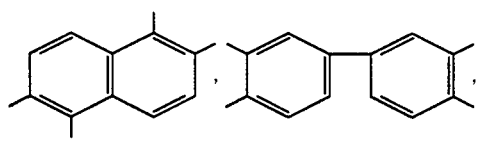

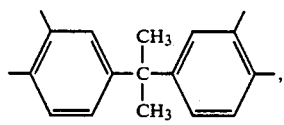

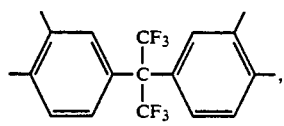

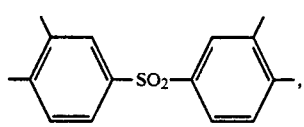

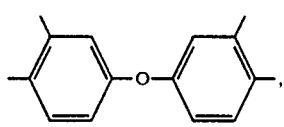

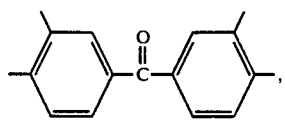

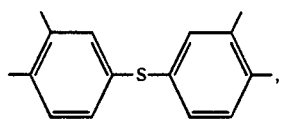

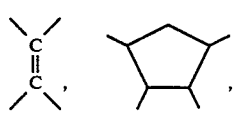

and the like.

The group of the formula:

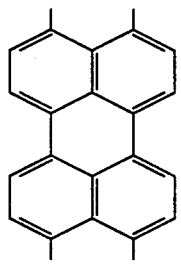

is also preferable as the group $R^1$.

The group $R^2$ in the formula (1) is a bivalent group having at least 2 carbon atoms. It may be an aromatic group; an aliphatic group; an alicyclic group; a group wherein an aromatic group and an aliphatic group are combined; a group wherein each of the above-mentioned bivalent groups is substituted by a monovalent group having 1 to 30 carbon atoms selected from the group consisting of an aliphatic group, an alicyclic group, an aromatic group and a group in which an aliphatic group is combined with an alicyclic group or an aromatic group; or a group wherein each of the preceding groups is substituted by a monovalent group such as a halogen atom, nitro group, amino group, cyano group, methoxyl group or acetoxyl group, or by a group in which the above monovalent group bonds to —O—, —COO—, —NHCO—, —CO—, —S—, —CSS—, —NHCS—, —CS—, or the like. Groups characterized by benzenoid unsaturation having at least 6 carbon atoms are preferred as the group $R^2$ in points of heat resistance, chemical resistance and mechanical properties.

Representative examples of the group $R^2$ are,

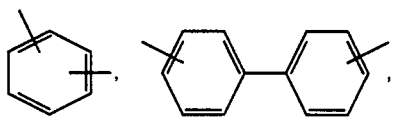

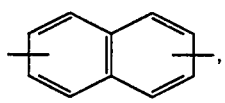

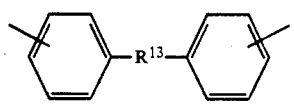
[wherein R$^{13}$ is
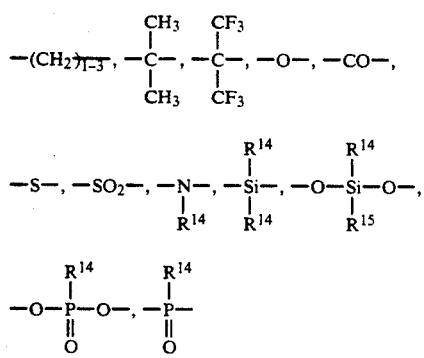
in which R$^{14}$ and R$^{15}$ are an alkyl or aryl group having 1 to 30 carbon atoms],
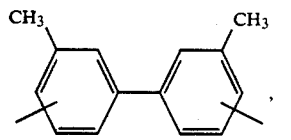
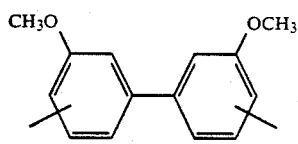
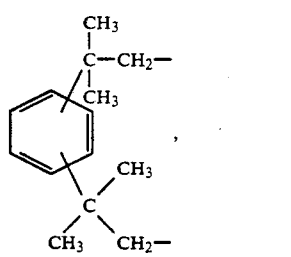
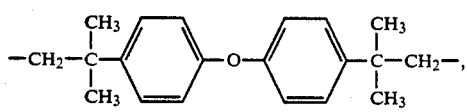
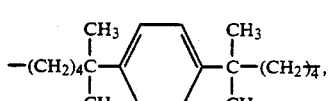
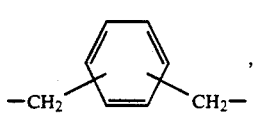
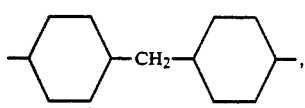
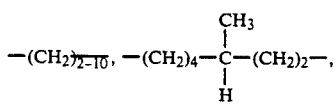
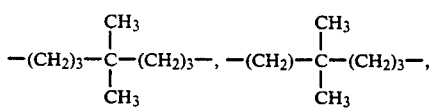
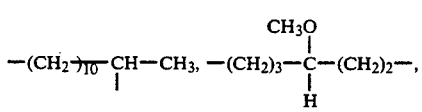
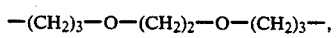
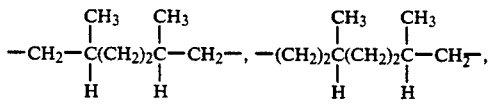
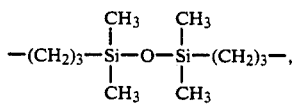
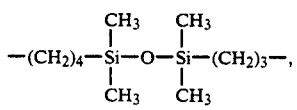
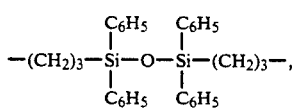
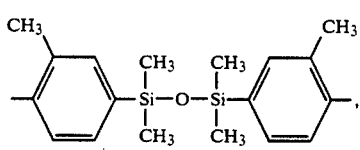
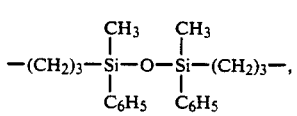
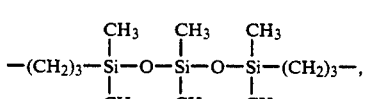
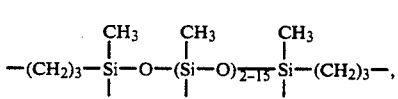
and the like.
Preferable groups R$^2$ are, for example,
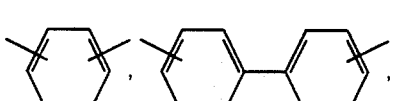
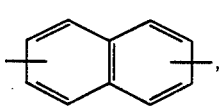

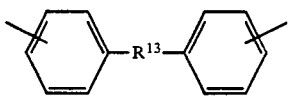

wherein $R^{13}$ is as defined above, and the like.

Each of the groups $R^3$, $R^4$, $R^5$ and $R^6$ in the formula (1) is hydrogen atom or a monovalent group having 1 to 30 carbon atoms, preferably 1 to 22 carbon atoms, such as a monovalent aliphatic group, a monovalent alicyclic group, a monovalent aromatic group, a monovalent group in which an aliphatic group is combined with an aromatic group or an alicyclic group, or their halogen, nitro, amino, cyano, methoxy or acetoxy substituted groups.

The groups $R^3$, $R^4$, $R^5$ and $R^6$ are groups introduced in order to impart a hydrophobic property to a polyamide acid having the recurring unit of the formula (24):

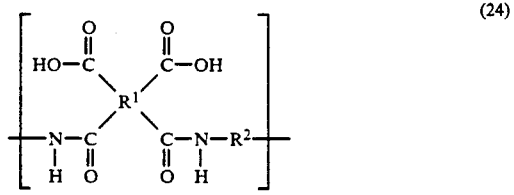

(24)

wherein $R^1$ and $R^2$ are as defined above. For forming a stable monolayer film on the water surface and permitting deposition of the film onto a substrate by the LB method, it is necessary that at least one of $R^3$, $R^4$, $R^5$ and $R^6$, preferably at least two of them, more preferably two of them, are neither hydrogen atom nor the above defined groups having 1 to 11 carbon atoms, preferably 1 to 15 carbon atoms, in other words, at least one of $R^3$, $R^4$, $R^5$ and $R^6$, preferably at least two of them, are a monovalent group having 12 or more carbon atoms, preferably 16 or more carbon atoms, selected from the above defined groups.

Representative examples of the groups $R^3$, $R^4$, $R^5$ and $R^6$ mentioned above are, for instance,

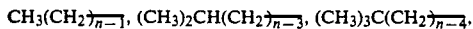

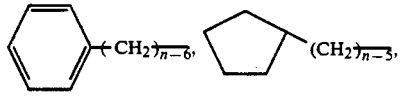

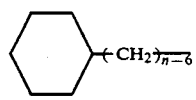

wherein n is an integer of 12 to 30, preferably 16 to 22, and the like.

For permitting the copolymeric and amphiphilic polyimide precursor of the invention to form a film by the LB technique, it is the most preferable that at least one, preferably at least two, of the groups $R^3$, $R^4$, $R^5$ and $R^6$ is a straight-chain alkyl group of the formula:

wherein n is as defined above, from the viewpoint of performances and cost. It is not essential that the substituent group, i.e. halogen atom, nitro group, amino group, cyano group, methoxyl group or acetoxyl group, as mentioned above is included in the groups $R^3$, $R^4$, $R^5$ and $R^6$. But it is preferable that fluorine atoms are included in the groups $R^3$, $R^4$, $R^5$ and $R^6$, because fluorine atoms vastly improve the hydrophobic property as compared with hydrogen atoms.

In the present invention, the copolymer useful as the amphiphilic polyimide precursor has the recurring unit of the formula (1):

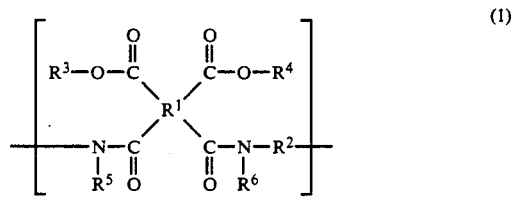

(1)

wherein $R^1$, $R^2$, $R^3$, $R^4$, $R^5$ and $R^6$ are as defined above; a part of at least one of the groups $R^1$ and $R^2$ being substituted with a group having a valence different from each of the substituted $R^1$ and $R^2$.

When a part of the group $R^1$ is substituted, the substituent group is selected from groups other than tetravalent groups, that is, bivalent groups and trivalent groups can be employed. Among them, trivalent groups are preferable from the point of heat resistance. In such a case, the polyimide precursor has the recurring unit of the formula (2) or (3):

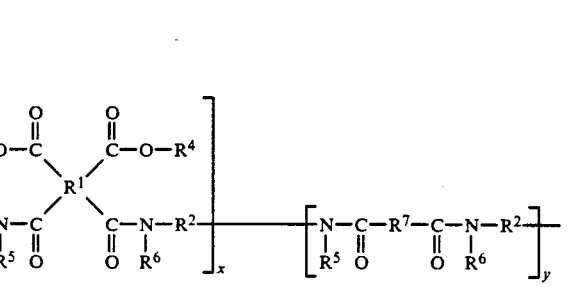

(2)

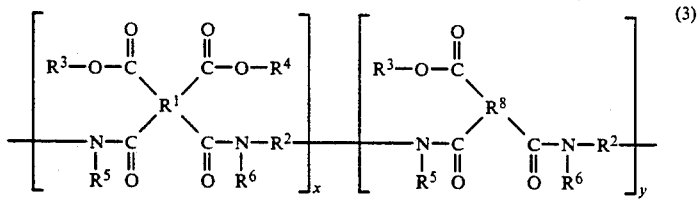
(3)

wherein the groups $R^1$ to $R^6$, x and y are as defined above, and $R^7$ and $R^8$ are respectively a bivalent group or a trivalent group having at least 2 carbon atoms.

When a part of the group $R^2$ is substituted, the substituent group is selected from groups other than bivalent groups. It is preferable to use trivalent groups or tetravalent groups. In such a case, the polyimide precursor has the recurring unit of the formula (4) or (5):

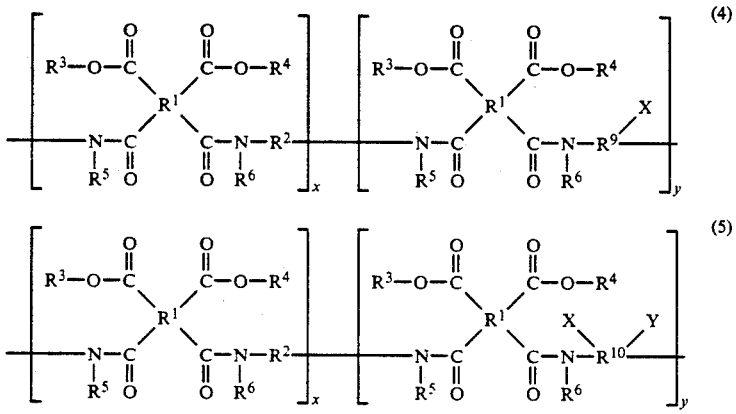

wherein the groups $R^1$ to $R^6$ are as defined above, each of $R^9$ and $R^{10}$ is a trivalent group or a tetravalent group having at least 2 carbon atoms, and X and Y are substituent groups bonded to the group $R^9$ or $R^{10}$. Preferable examples of X and Y are, for instance, —NHR', —CONHR'—SO$_2$NHR' wherein R' is an alkyl group or hydrogen atom, and the like.

The modification of the amphiphilic polyimide precursor of the present invention is important for improving the built-up property in Langmuir-Blodgett technique and the property of polyimide thin film obtained by ring-closing the built-up layer on a substrate. Particularly, when a part of the group $R^2$ is substituted with trivalent or tetravalent groups, a ring structure whose heat resistances is expected to be better than that of the imide ring is formed.

The groups $R^7$ to $R^{10}$ are bivalent, trivalent and tetravalent groups having at least 2 carbon atoms, preferably 5 to 20 carbon atoms. They may be an aromatic group; an alicyclic group; an aliphatic group; a group wherein an aromatic group and an aliphatic group are combined; a group wherein each of the above-mentioned groups is substituted by a monovalent group having 1 to 30 carbon atoms selected from the group consisting of an aliphatic group, an alicyclic group, an aromatic group, and a group in which an aliphatic group is combined with an aromatic group or alicyclic group; or a group wherein each of the preceding groups is substituted by a monovalent group such as a halogen atom, nitro group, amino group, cyano group, methoxyl group or acetoxyl group, or by a group in which the above monovalent group bonds to —O—, —COO—, —NH-CO—, —CO—, —S—, —CSS—, —NHCS—, —CS—, or the like. Groups characterized by benzenoid unsaturation having at least 6 carbon atoms are preferred as the groups $R^7$ to in points of heat resistance, chemical resistance and mechanical properties.

Representative examples of the groups $R^7$, $R^8$, $R^9$ and $R^{10}$ are, for instance,

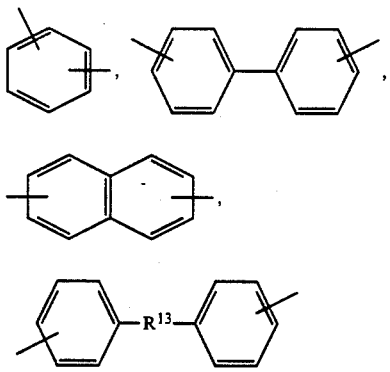

wherein $R^{13}$ is as defined above,

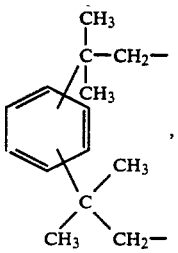

-continued
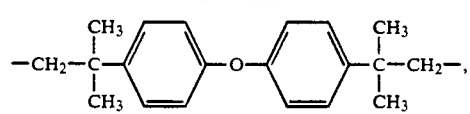
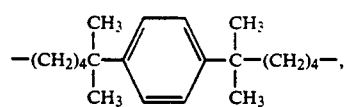
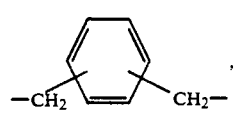
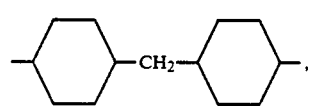
$-(CH_2)_{2-10}-$, 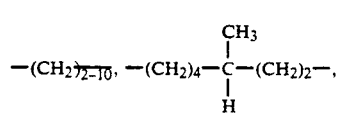
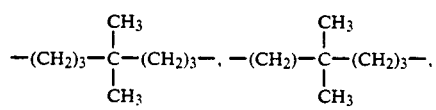
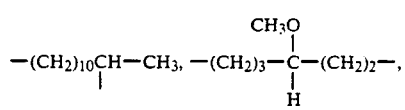
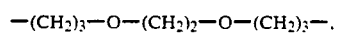
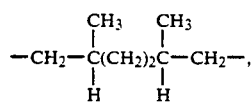
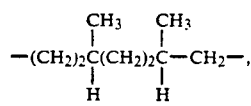
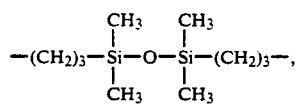
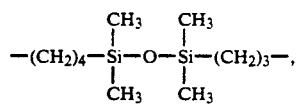
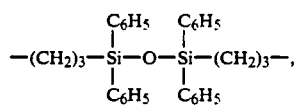
-continued
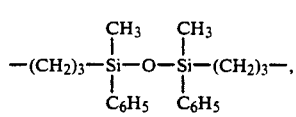
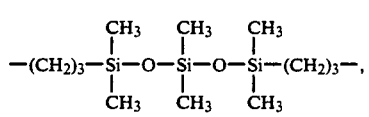
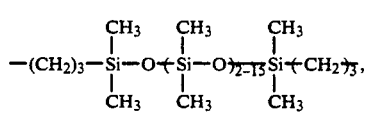
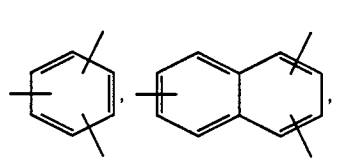
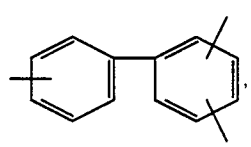
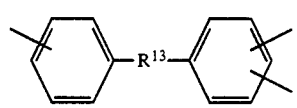
wherein $R^{13}$ is as defined above,
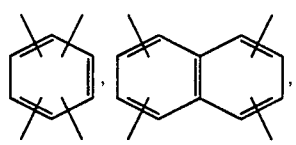
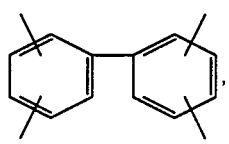
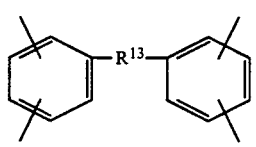
wherein $R^{13}$ is as defined above,

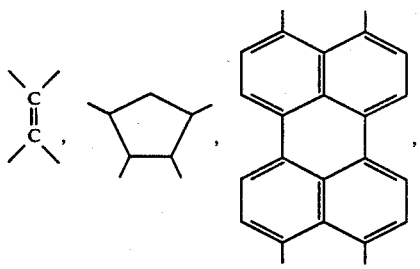

and the like.
Preferable examples of the above groups are,

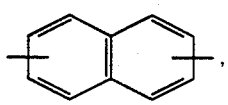

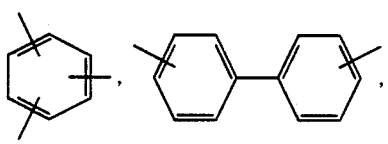

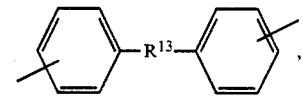

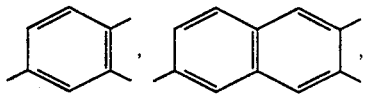

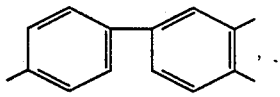

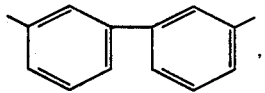

-continued

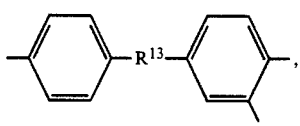

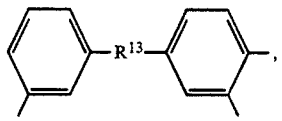

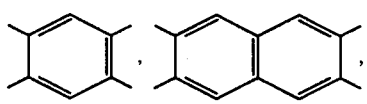

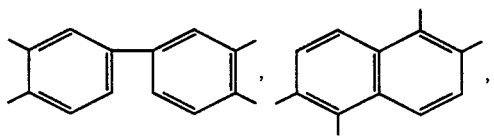

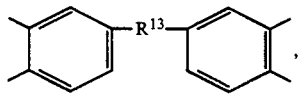

wherein $R^{13}$ is as defined above, and the like.

The positions of three or four bonds of the groups $R^8$, $R^9$ and $R^{10}$, that is to say, the positions of the bonds linking

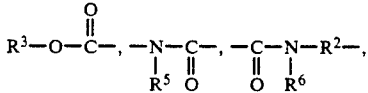

X and Y, to the recurring units (3) to (5) are not particularly limited. However, it is preferable that two from among these three or four bonds are present at adjacent carbon atoms constituting the groups $R^8$, $R^9$ and $R^{10}$, since a five-membered or six-membered ring is easy to be formed when a film formed from the copolymeric polyimide precursor is ring-closed.

When two groups from among the groups $R^3$, $R^4$, $R^5$ and $R^6$ are hydrogen atoms, the copolymeric and amphiphilic polyimide presursors of the present invention have the recurring unit of the following formulas:

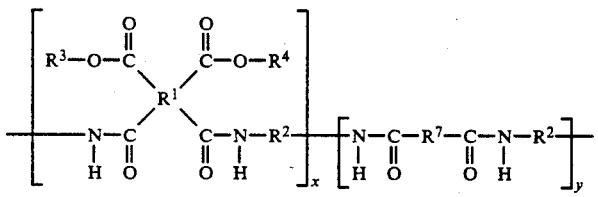

(6)

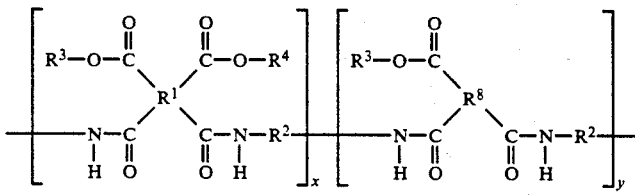

(7)

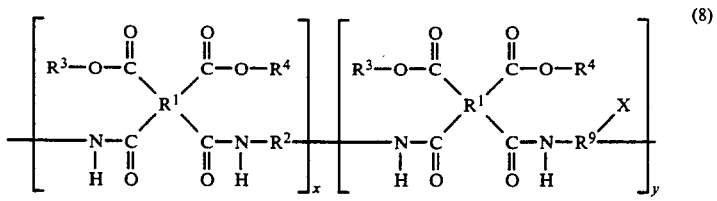
(8)

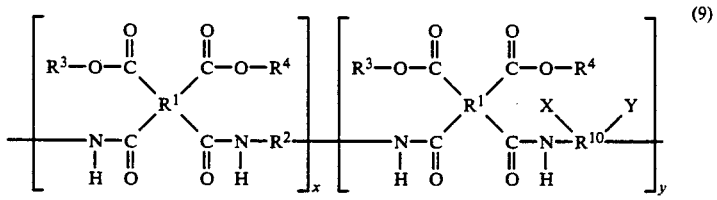
(9)

wherein $R^1$, $R^2$, $R^3$, $R^4$, $R^7$, $R^8$, $R^9$ and $R^{10}$ are as defined above, provided that $R^3$ and $R^4$ are neither hydrogen atoms nor a group having 1 to 11 carbon atoms, and X, Y, x and y are as defined above;

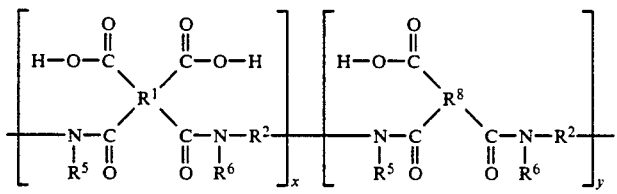

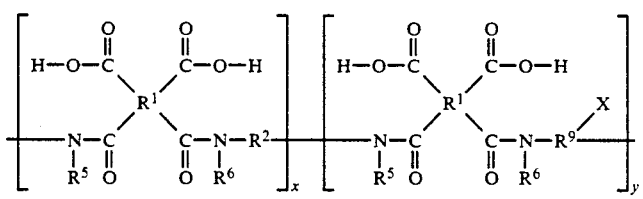

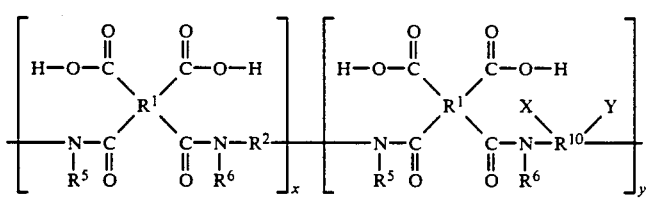

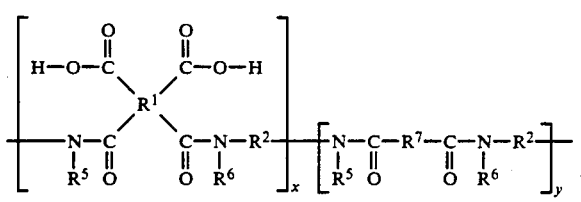

wherein $R^1$, $R^2$, $R^5$, $R^6$, $R^7$, $R^8$, $R^9$ and $R^{10}$ are defined above provided that $R^5$ and $R^6$ are neither hydrogen atom nor a group having 1 to 11 carbon atoms and X, Y, x and y are as defined above. The copolymeric and amphiphilic polyimide precursors having the recurring unit of the above formulas are advantageous in easiness of production and cost.

Representative examples of the copolymeric and amphiphilic polyimide precursor of the present invention having the above recurring unit are, for instance, those having the recurring unit of the formula:

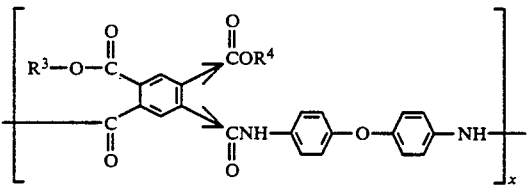

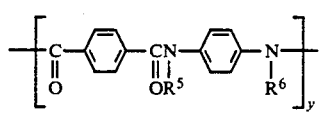

[in which typical examples of $R^3$, $R^4$, $R^5$ and $R^6$ are $CH_3(CH_2)_{11}—$, $CH_3(CH_2)_{13}—$, $CH_3(CH_2)_{15}—$, $CH_3(CH_2)_{17}—$, $CH_3(CH_2)_{19}—$, $CH_3(CH_2)_{21}—$, $CF_3(CH_2)_{15}—$, and the like],

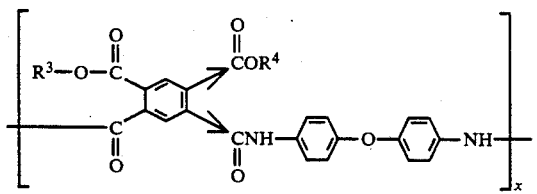

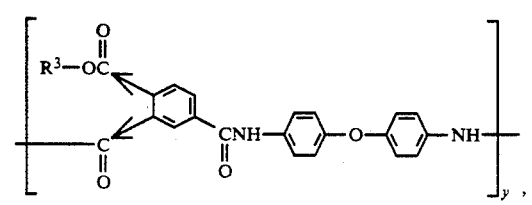

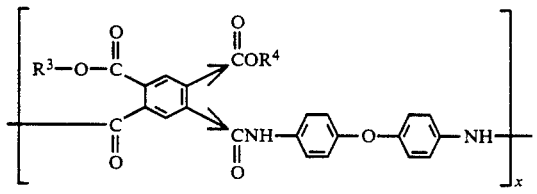

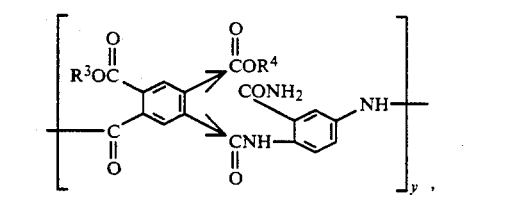

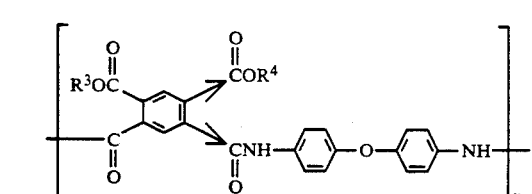

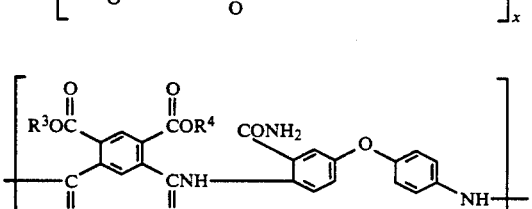

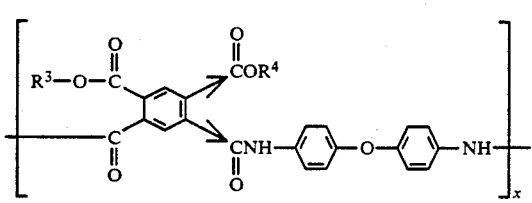

-continued

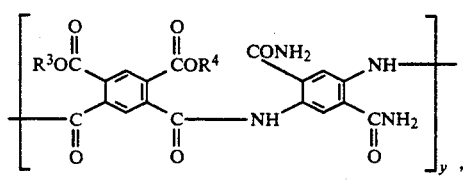

[in which typical examples of $R^3$ and $R^4$ are $CH_3(CH_2)_{11}—$, $CH_3(CH_2)_{13}—$, $CH_3(CH_2)_{15}—$, $CH_3(CH_2)_{17}—$, $CH_3(CH_2)_{19}—$, $CH_3(CH_2)_{21}—$, $CF_3(CH_2)_{15}—$, and the like],

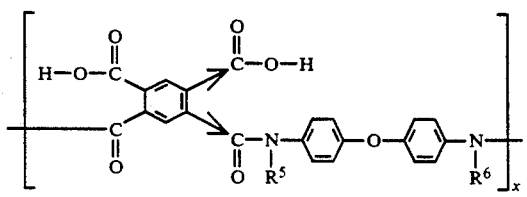

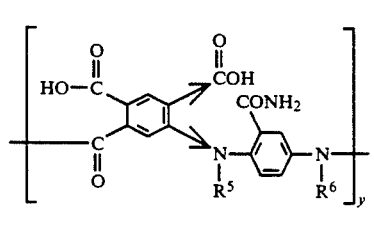

[in which typical examples of $R^5$ and $R^6$ are $CH_3(CH_2)_{11}—$, $CH_3(CH_2)_{13}—$, $CH_3(CH_2)_{15}—$, $CH_3(CH_2)_{17}—$, $CH_3(CH_2)_{19}—$, $CH_3(CH_2)_{21}—$, $CF_3(CH_2)_{15}—$ and the like],

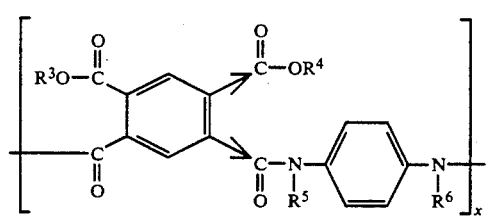

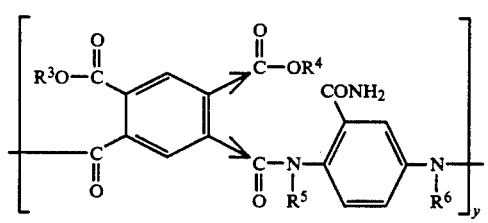

[in which typical examples of $R^3$ and $R^4$ are, for instance, $CH_3(CH_2)_{11}—$, $CH_3(CH_2)_{13}—$, $CH_3(CH_2)_{15}—$, $CH_3(CH_2)_{17}—$, $CH_3(CH_2)_{19}—$, $CH_3(CH_2)_{21}—$, $CF_3(CH_2)_{15}—$, and the like, and typical examples of $R^5$ and $R^6$ are, for instance, $CH_3—$, $CH_3(CH_2)_2—$, $CH_3(CH_2)_5—$, and the like], and the like.

In the above formulas, the symbol "→" means isomerism. Explaining the isomerism with reference to the recurring unit of the formula:

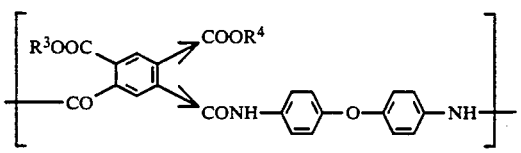

the above formula represents both the recurring unit of the formula (a):

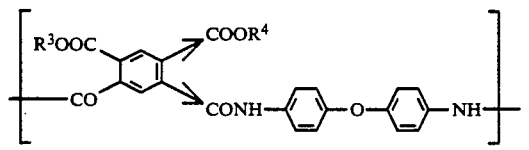

and the recurring unit of the formula (b):

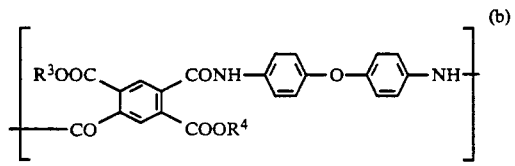

and in such a case, the symbol "→" indicating the isomerism is used.

In the present specification, the term "isomerism" or the symbol "→" comprehends the both cases, one being the case where either one of the recurring units as shown by the formulas (a) and (b) is present alone, and the other being the case where the recurring units as shown by the formulas (a) and (b) are present together.

Various copolymers are provided when at least one of the groups $R^1$ to in the formulas (1) to (5) is at least two kinds of groups selected from the respective representative examples of the groups $R^1$ to explained above. The precursors of the present invention include such a precursor.

In general, the copolymeric and amphiphilic polyimide precursors of the present invention are soluble in an organic polar solvent such as N,N-dimethylacetamide, N,N-dimethylformamide, N,N-diethylformamide or hexamethylphosphoramide, are soluble in a mixed solvent of the above-mentioned organic polar solvent and a usual organic solvent such as chloroform, and are slightly soluble or insoluble in a usual organic solvent such as benzene, ether, chloroform, acetone or methanol. In the infrared absorption spectrum of the precursor, characteristic absorptions for amide, carboxylic acid (in certain cases, carboxylic acid ester) and long chain alkyl group are observed. The result of the thermal analysis of the precursors is also characteristic, and a sudden loss of the weight begins at about 200° C. and is completed at about 400° C. After the completion of the weight loss, the infrared absorptions for amide, carboxylic acid (in certain cases, carboxylic acid ester) and long chain alkyl group disappear, and an absorption for heterocyclic ring such as imide ring appears. This means that the precursor is converted into a polymer with heterocyclic ring structure.

The aforementioned explanation has been made with reference to the case where all the recurring units of the precursor are those represented by the formula (1). However, the precursors of the present invention may contain about 30 % by mole of the recurring unit of the formula (25):

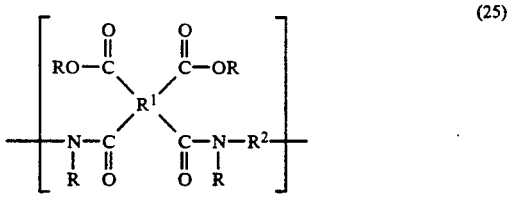

wherein $R^1$ and $R^2$ are as defined above, R is a monovalent group having 1 to 11 carbon atoms selected from the group consisting of a monovalent aliphatic group, a monovalent alicyclic group, a monovalent aromatic group, a monovalent group in which an aliphatic group is combined with an aromatic group or an alicyclic group, and their substituted monovalent groups with a halogen atom, nitro group, amino group, cyano group, methoxyl group or acetoxyl group, or hydrogen atom, and four groups R may be the same or different.

The copolymeric and amphiphilic polyimide precursors of the present invention having the recurring unit of the formula (1) can be prepared by the following method. For instance, the precursor having the recurring unit of the formula (4) is prepared as follows:

A tetracarboxylic acid dianhydride of the formula (10):

wherein $R^1$ is as defined above, is reacted with $R^3OH$ and $R^4OH$ wherein $R^3$ and $R^4$ are as defined above, to produce a compound of the formula (11):

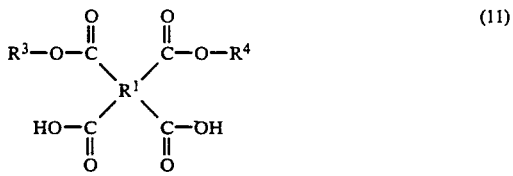

wherein $R^1$, $R^3$ and $R^4$ are as defined above. The compound (11) is then converted into an acid halide, for instance, by reacting with thionyl chloride, phosphorus pentachloride, benzenesulfonyl chloride, or the like in a substantially anhydrous polar solvent at a temperature of not lower than −10° C., preferably about 0° to about 40° C. The acid halide is reacted with a compound of the formula (15):

$$R^5-NH-R^2-NH-R^6 \quad (15)$$

wherein $R^2$, $R^5$ and $R^6$ are as defined above, and the compound of the formula (16):

wherein $R^5$, $R^6$, $R^9$ and X are as defined above. The acid halide may be added to the compounds (15) and (16), or inversely the compounds (15) and (16) may be added to the acid halide. The reaction of the acid halide and the compounds (15) and (16) is conducted at a temperature of not lower than $-10°$ C., preferably 0° to 10° C., and may be conducted at a temperature of not lower than 20° C. to complete the reaction.

There is a case where the reaction must be conducted at a temperature other than the general temperature range as mentioned above. That is to say, when the groups $R^5$ and $R^6$ are neither hydrogen atom nor the group having 1 to 11 carbon atoms, there is adopted a manner in which the acid halide of the compound (11) is added to a solution of the compounds (15) and (16) at a temperature of 50° to 60° C. in order to cause the compounds (15) and (16) to react in a homogeneous system.

Representative examples of the tetracarboxylic acid dianhydride (10) are, for instance:

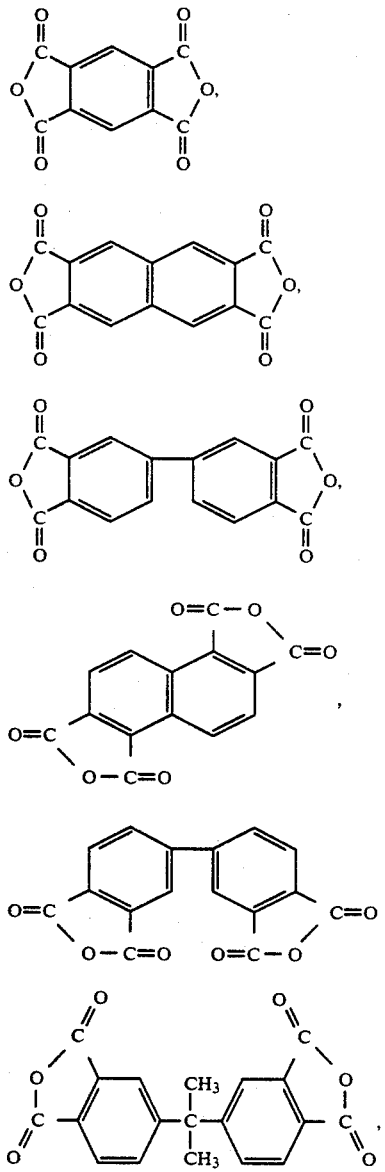

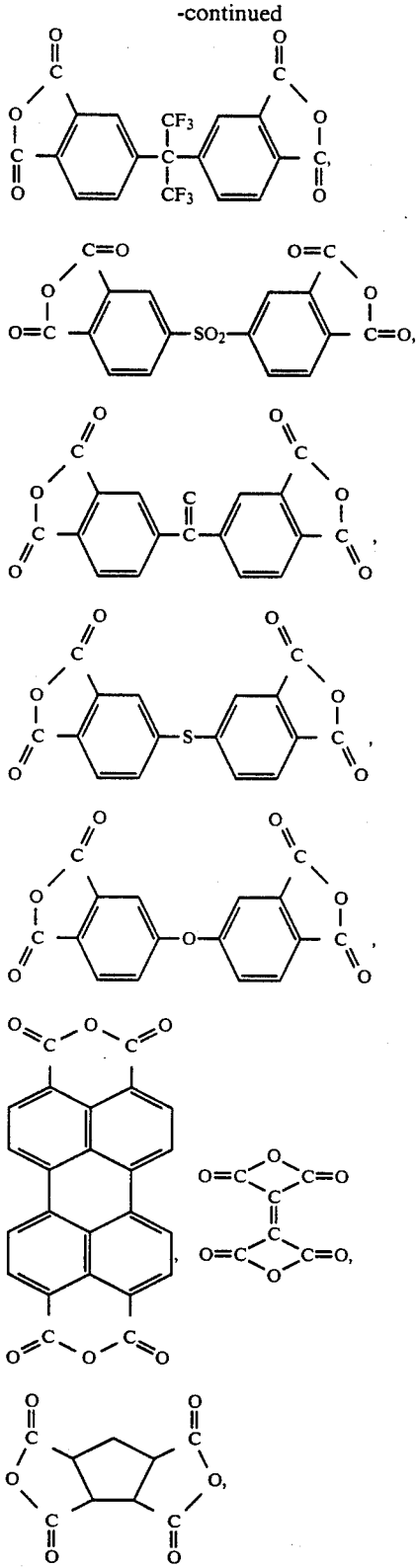

-continued and the like.

Representative examples of the compounds $R^3OH$ and $R^4OH$ are, for instance, $CH_3OH$, $CH_3CH_2OH$, $CH_3(CH_2)_2OH$, $CH_3(CH_2)_3OH$, $CH_3(CH_2)_5OH$, $CH_3(CH_2)_7OH$, $CH_3(CH_2)_9OH$, $CH_3(CH_2)_{11}OH$, $CH_3(CH_2)_{13}OH$, $CH_3(CH_2)_{15}OH$, $CH_3(CH_2)_{17}OH$, CH$_3$(CH$_2$)$_{19}$OH, CH$_3$(CH$_2$)$_{21}$OH, CH$_3$(CH$_2$)$_{23}$OH, CF$_3$(CH$_2$)$_{15}$OH, H(CF$_2$)$_2$(CH$_2$)$_{15}$OH, H(CF$_2$)$_4$(CH$_2$)$_{13}$OH, F(CF$_2$)$_8$(CH$_2$)$_2$OH, F(CF$_2$)$_8$(CH$_2$)$_4$OH,

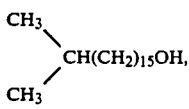

(CH$_3$)$_3$C(CH$_2$)$_{14}$OH,

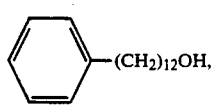

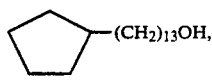

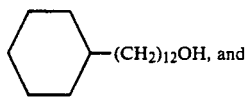

the like.

The reaction conditions for producing the compound (11) by the reaction of the tetracarboxylic acid dianhydride (10) with R$^3$OH and R$^4$OH are not particularly limited. For instance, the reaction can be conducted in a manner in which the reaction system is stirred at about 100° C. for several hours in a nitrogen stream, or there are adopted general conditions such that the reaction is conducted with stirring at room temperature for about 4 days in a solvent such as hexamethylphosphoramide. From the viewpoint of shortening the reaction time, namely better productivity, it is advantageous that the reaction is conducted with stirring at an elevated temperature, e.g. about 100° C., for several hours, e.g. 3 hours, in a nitrogen stream, and after cooling the reaction mixture, it is dissolved in hexamethylphosphoramide and is then subjected to the next reaction for converting into the acid halide. Of course, the obtained compound (11) may be purified by a method such as recrystallization, prior to converting into the acid halide, for the purpose of improving the purity.

As the polar solvents used in the reaction for converting the compound (11) into the acid halide, there are mentioned, for instance, hexamethylphosphoramide, N,N-dimethylacetamide and N,N-dimethylformamide. The solvents are used in a substantially anhydrous state. That is to say, the reaction for the conversion into the acid halide is conducted under an approximately quantitative condition such that thionyl chloride, phosphorus pentachloride, benzenesulfonyl chloride, or the like used in the reaction would not decompose by moisture.

When the reaction temperature for the conversion into the acid halide is lower than −10° C., the reaction becomes heterogeneous due to freezing of long chain alkyl groups. However, it is found by the present inventors that if the temperature is not lower than −10° C., the temperature up to near the boiling point of the acid halide can be used without restriction. Usually, the temperature within the range of about 0° to about 40° C. is preferable.

The thus prepared acid halide is then reacted with the compounds (15) and (16) to produce the precursor of the present invention. From the viewpoint of the workability, it is desirable to use the obtained acid halide as it is without any treatment. In the reaction of the acid halide and the compounds (15) and (16), both the reactants and the product tend to solidify by the long chain alkyl group of the groups R$^3$, R$^4$, R$^5$ and R$^6$ present in these compounds and, therefore, it is general to use a solvent such as N,N-dimethylacetamide or N,N-dimethylformamide. The reaction temperature is not lower than −10° C., preferably from −10° to +20° C., more preferably from 0° to +10° C. When the reaction temperature is lower than −10° C., the reaction becomes heterogeneous owing to freeze solidification. The reaction temperature over 20° C., should be avoid in the initial stage of the reaction because it is considered that in the initial stage undesirable reactions are easy to occur. However, the use of the reaction temperature over 20° C. in the latter stage of the reaction is advantageous in order to complete the reaction and in order to keep the reaction homogeneous to the completion of the reaction.

Representative examples of the compound (15) are, for instance,

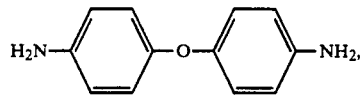

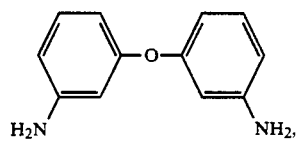

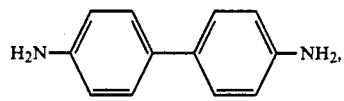

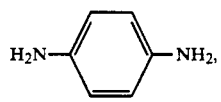

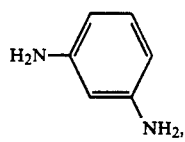

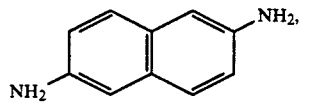

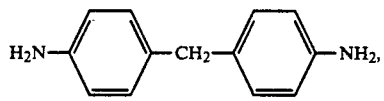

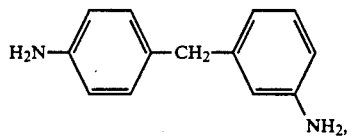

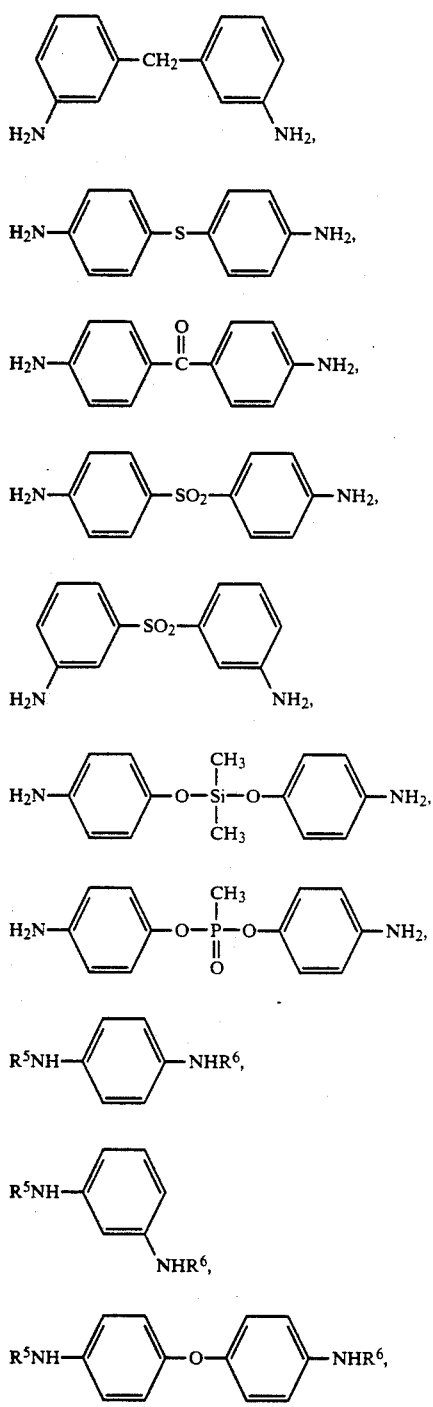

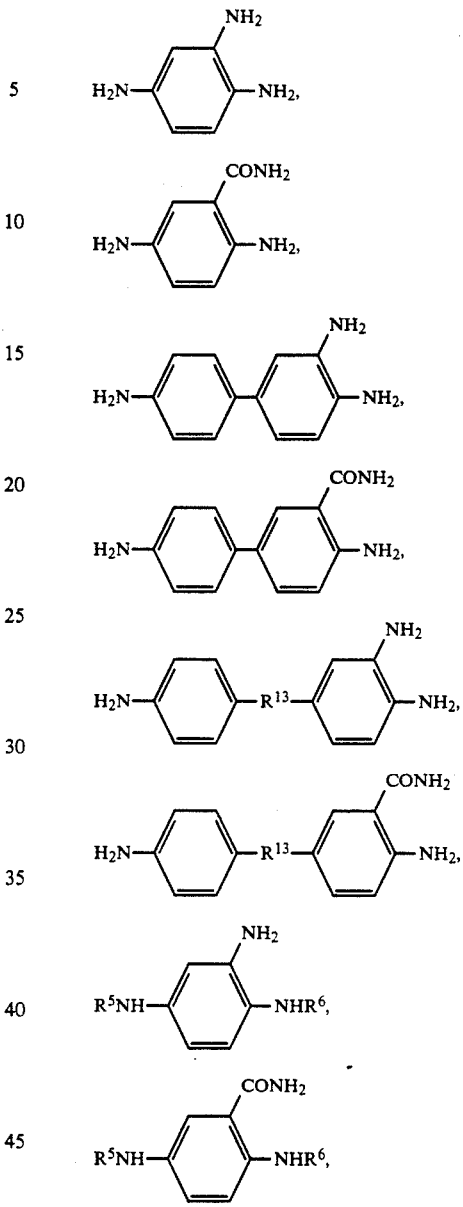

wherein R[5] and R[6] are as defined above. Representative examples of the groups R[5] and R[6] are, for instance, $CH_3-$, $CH_3CH_2-$, $CH_3(CH_2)_2-$, $CH_3(CH_2)_3-$, $CH_3(CH_2)_5-$, $CH_3(CH_2)_{11}-$, $CH_3(CH_2)_{13}-$, $CH_3(CH_2)_{15}-$, $CH_3(CH_2)_{17}-$, $CH_3(CH_2)_{19}-$, $CH_3(CH_2)_{21}-$, $CH_3(CH_2)_{23}-$, $CF_3(CH_2)_{15}-$, $H(CF_2)_2(CH_2)_{15}-$, $H(CF_2)_4(CH_2)_{13}-$, $F(CF_2)_8(CH_2)_2-$, $F(CF_2)_8(CH_2)_4-$, and the like.

Representative examples of the compound (16) are, for instance, and the like, wherein R[13] is as defined above, R[5] and R[6] are as defined in the representative examples of the compound (15).

The ratio of the acid halide to the compounds (15) and (16) is suitably selected so as to produce the precursor having a desired molecular weight. In case of preparing polyamide acids suitable for forming films, stoichiometric amounts of the purified monomers and a purified solvent have been used for obtaining the product having a high molecular weight. However, in the case where the precursor of the invention is used for forming films by building up monomolecular layer of the precursor on a substrate, a high molecular weight is not always required and even if the precursor has not a high molecular weight, sufficient characteristics can be exhibited. Accordingly, the molar ratio of the reactants may deviate from stoichiometric one, and the acid halide and the compounds (15) and (16) can be used in a molar ratio of about 1/0.8 to about 1/1.2 without causing any problems.

When both the groups $R^3$ and $R^4$ of $R^3OH$ and $R^4OH$ to be reacted with the tetracarboxylic acid dianhydride are neither hydrogen atom nor a group having 1 to 11 carbon atoms, both of the groups $R^5$ and $R^6$ in the compounds (15) and (16) may be hydrogen atom, and in that case, the precursors having the recurring unit represented by the formula (8) are obtained. The use of the compound (15) in which both of the groups $R^5$ and $R^6$ are hydrogen atom, is advantageous in that the reactivity is good and the raw material cost is inexpensive. Also, in that case, since the —$COOR^3$ and —$COOR^4$ groups in the obtained precursor are in the state of ester, the precursor is thermally stable and the reaction scarcely proceeds in isolation and drying steps and, therefore, the precursor is separable in the form of solid powder and thus purification is easy.

The copolymeric and amphiphilic polyimide precursors of the present invention can be prepared by the process mentioned above. When both of the groups $R^3$ and $R^4$ in the formula (4) are hydrogen atom, the precursors of the present invention having the recurring unit having the formula (21) can be prepared by directly reacting the tetracarboxylic acid dianhydride (10) with a compound of the formula (18):

$$R^{11}-NH-R^2-NH-R^{12} \qquad (18)$$

wherein $R^2$, $R^{11}$ and $R^{12}$ are as defined above, and a compound of the formula (20):

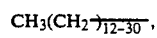
(20)

wherein $R^9$, $R^{11}$, $R^{12}$ and X are as defined above. The reaction can be made either in a manner in which the tetracarboxylic acid dianhydride (10) is added to the compounds (18) and (20) or in a manner in which the compounds (18) and (20) are added to the dianhydride (10).

Representative examples of the compound (18) are, for instance,

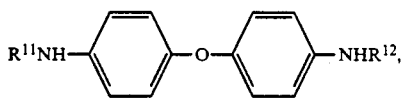

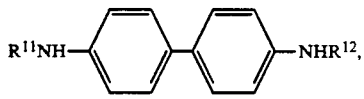

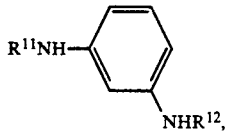

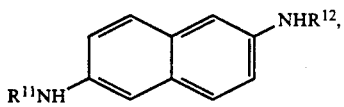

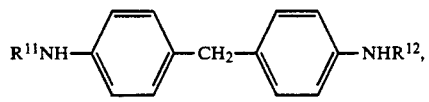

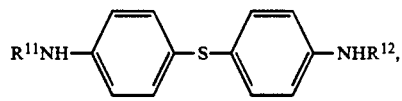

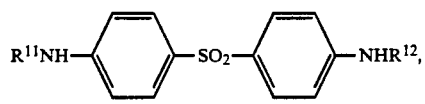

wherein representative examples of the groups $R^{11}$ and $R^{12}$ are $CH_3(CH_2)_{\overline{12-30}}$, $CF_3(CH_2)_{15}-$, $H(CF_2)_2(CH_2)_{15}-$, $H(CF_2)_4(CH_2)_{13}-$, $F(CF_2)_8(CH_2)_2-$, $H(CF_2)_8(CH_2)_4-$, and the like.

Representative examples of the compound (20) are, for instance,

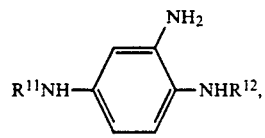

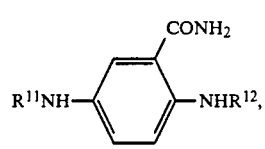

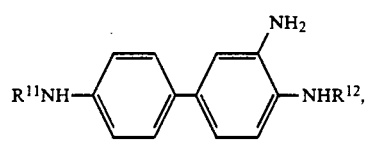

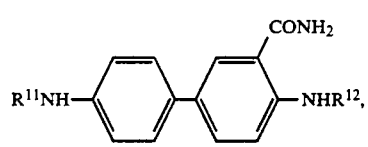

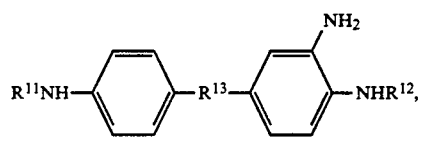

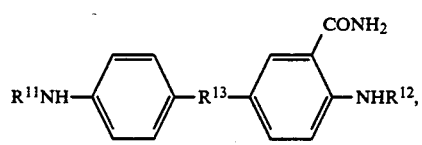

$R^{11}$, $R^{12}$ and $R^{13}$ are as defined above, and the like.

Approximately the same conditions as those in conventional preparation of polyamide acids are applicable to the reaction of the tetracarboxylic acid dianhydride

(10) and the compounds (18) and (20). For instance, the reaction is conducted in a substantially anhydrous organic polar solvent such as N,N-dimethylacetamide or N,N-dimethylformamide at a temperature of not higher than 50° C., preferably room temperature, using the compounds (18) and (19) in an amount of 0.8 to 1.2 moles per mole of the tetracarboxylic acid dianhydride (10). Even if the amounts of the reactants deviate from the stoichiometric amounts, the obtained precursors exhibit satisfactory characteristics.

The thus prepared precursors of the present invention having the recurring unit (21) have also the features that they can form films by the LB method and provide polyimides by heating, in addition to easiness in preparation.

The precursors (2), (3) and (5) can be prepared in the same manner as in the preparation of the precursor (4). The precursor (2) can be prepared by the following method.

A tetracarboxylic acid dianhydride of the formula (10):

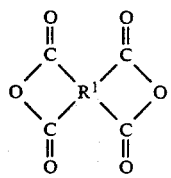
(10)

wherein $R^1$ is as defined above, is reacted with $R^3OH$ and $R^4OH$ wherein $R^3$ and $R^4$ are as defined above, to produce a compound of the formula (11):

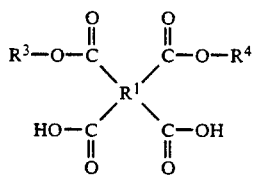
(11)

wherein $R^1$, $R^3$ and $R^4$ are as defined above. The compound (11) and a compound having the formula (12):

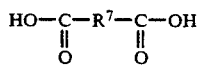
(12)

wherein $R^7$ is as defined above, are converted into acid halides in a substantially anhydrous polar solvent at a temperature of not lower than $-10°$ C. The acid halides are reacted with a compound of the formula (15):

$$R^5-NH-R^2-NH-R^6 \quad (15)$$

wherein $R^2$, $R^5$ and $R^6$ are as defined above, at a temperature of not lower than $-10°$ C. to produce the desired precursor (2).

Representative example of the compound having the formula (12) are, for instance,

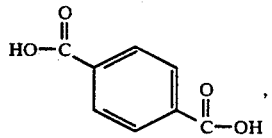

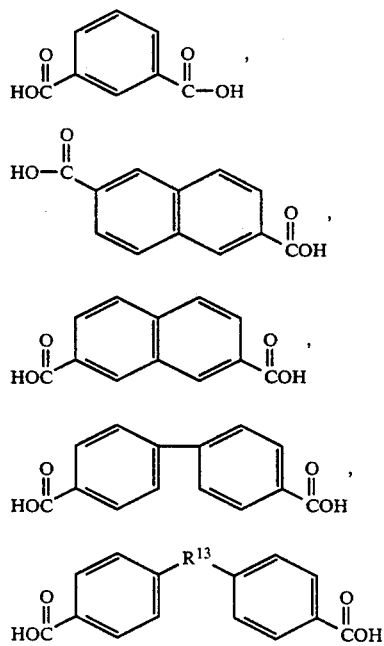

wherein $R^{13}$ is as defined above, and the like.

The precursor having the recurring unit (3) can be produced by the following method. The compound produced from the compound of the formula (10) having the formula (11):

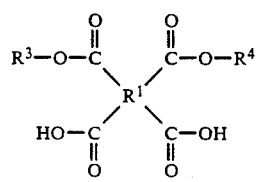
(11)

wherein $R^1$, $R^3$ and $R^4$ are as defined above and a compound having the formula (14):

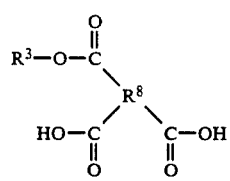
(14)

wherein $R^3$ and $R^8$ are as defined above which is produced from a compound having the formula (13):

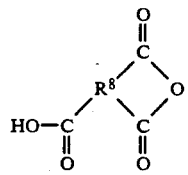
(13)

wherein $R^8$ is as defined above are converted into acid halides in a substantially anhydrous polar solvent at a temperature of not lower than $-10°$ C. These acid halides are reacted with a compound of the formula (15):

R⁵—NH—R²—NH—R⁶ (15)

wherein R², R⁵ and R⁶ are as defined above, at a temperature of not lower than −10° C. to produce the desired precursor (3).

The representative compounds having the formula (13) are, for instance,

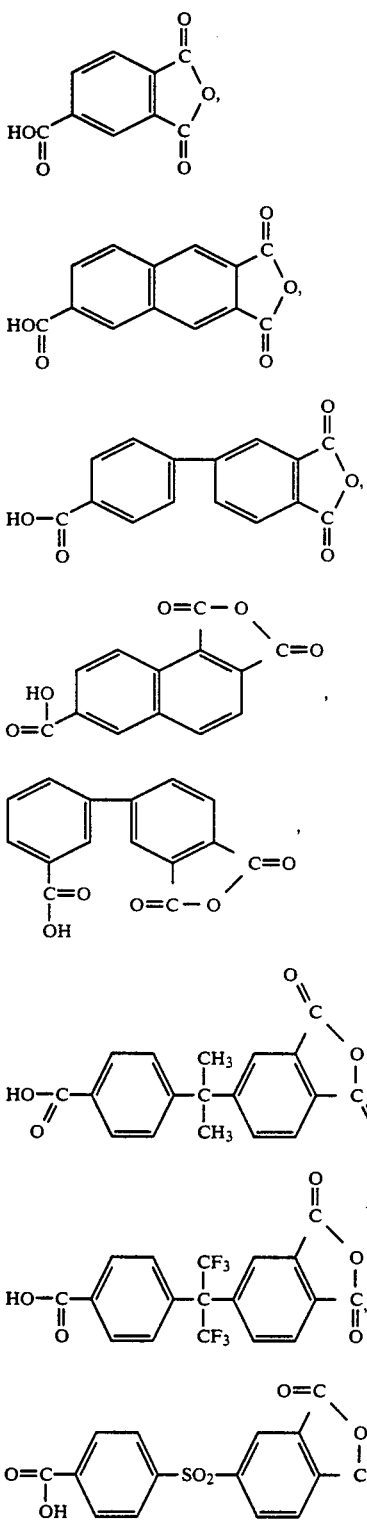

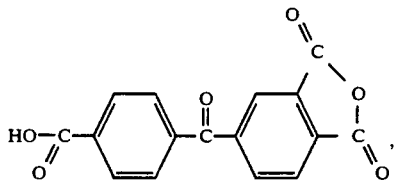

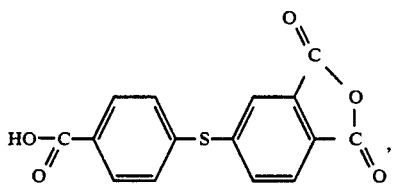

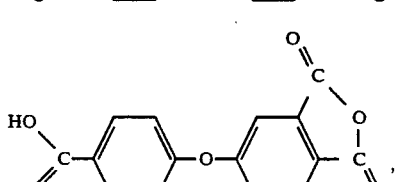

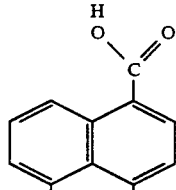

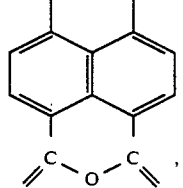

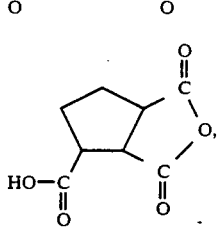

and the like.

The precursor having the recurring unit (5) can be produced by the following method. The compound produced from the compound of the formula (10) having the formula (11):

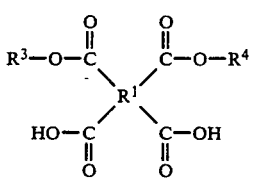

(11)

wherein R¹, R³ and R⁴ are as defined above, is converted into an acid halide in a substantially anhydrous polar solvent at a temperature of not lower than −10° C. The acid halide is reacted with a compound of the formula (15):

$$R^5-NH-R^2-NH-R^6 \quad (15)$$

wherein $R^2$, $R^5$ and $R^6$ are as defined above, and a compound of the formula (17):

$$R^5-NH\overset{X}{\underset{}{\diagdown}}R^{10}\overset{Y}{\underset{}{\diagup}}-NH-R^6 \quad (17)$$

wherein $R^5$, $R^6$, $R^{10}$, X and Y are as defined above, at a temperature of not lower than $-10°$ C. to produce the desired precursor (5).

Representative examples of the compound (17) are, for instance,

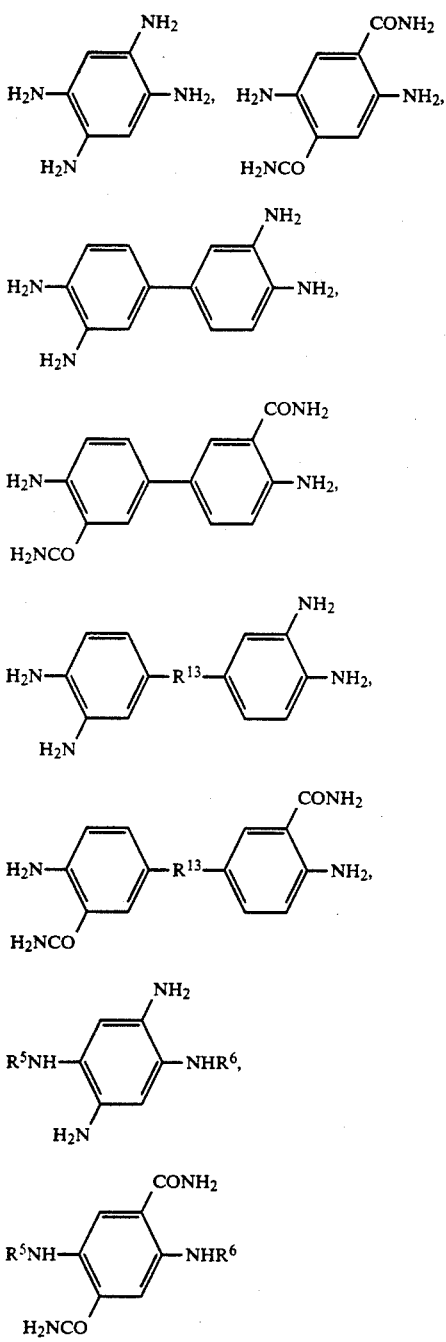

wherein $R^{13}$, $R^5$ and $R^6$ are as defined above, and the like.

LB films can be formed from the precursors of the present invention by any of the so-called LB technique without restriction, e.g. the vertical dipping method (LB method), the horizontal dipping method, the revolving cylindrical method and so on (as described in Shin Jikken Kagaku Koza, Vol. 18, "Interface and Colloid", pages 498–508). The LB technique is a method in which a LB material is spread onto the surface of water and compressed at a constant surface pressure to form monomolecular layer film and the monomolecular layer is transferred onto a substrate.

In general, a solvent such as benzene or chloroform which evaporates into a gas phase without dissolving in water, is used for spreading an LB film forming material onto the water surface. In case of the precursors of the present invention, it is preferable to use such a usual solvent in combination with an organic polar solvent for increasing the solubility. Examples of the organic polar solvent are, for instance, N,N-dimethylformamide, N,N-dimethylacetamide, N,N-diethylformamide, N,N-diethylacetamide, N,N-dimethylmethoxyacetoamide, dimethylsulfoxide, N-methyl-2-pyrrolidone, pyridine, dimethylsulfone, hexamethylphosphoramide, tetramethylenesulfone, dimethyltetramethylenesulfone, and the like. In case of using benzene, chloroform or the like in combination with the organic polar solvent, it is considered that when the precursor solution is spread onto the water surface, benzene, chloroform or the like evaporates into the gas phase and the organic polar solvent dissolves into a large quantity of water.

The concentration of the precursor solution to be spread onto the water surface is not particularly limited, but is usually selected from $2 \times 10^{-3}$ to $5 \times 10^{-3}$ M.

It is preferable that a built-up film is formed on a substrate by using a mixture of a known LB compound and the precursor of the invention, since film-forming properties are improved. Examples of the known LB compounds are, for instance, stearyl alcohol a compound of a formula:

$$CH_3(CH_2)_{\overline{a-1}}Z,$$

a compound of a formula:

$$CH_2=CH(CH_2)_{\overline{a-2}}Z,$$

a compound of a formula:

$$CH_3(CH_2)_{\overline{c}}C\equiv C-C\equiv C(CH_2)_{\overline{b}}Z,$$

wherein Z is —OH, —NH$_2$, —COOH, —CONH$_2$, or —COOR" in which R" is a lower fatty hydrocarbon group, a is an integer of 16 to 22 and $b+c=a-5$.

The substrates used for forming LB films of the precursors thereon are not particularly limited, and are selected according to the uses of the formed LB film. In case of converting the LB film into a copolymeric polyimide film by heating the LB film of the precursor, it is necessary that the substrates have a good heat resistance.

Examples of the substrate used in forming the LB films are, for instance, an inorganic substrate such as glass, alumina or quartz, a metal substrate, a plastic substrate, a substrate of a semiconductor of Groups IV, III-V, II-VI of the Periodic Table such as Si, GaAs or ZnS, a substrate of a ferroelectric substance such as $PbTiO_3$, $BaTiO_3$, $LiNbO_3$ or $LiTaO_3$, a substrate of a magnetic substance, and the like. The substrates may be surface-treated in a usual manner. Also, it is preferable to conduct surface-treatment to the surface of the substrate with a silane coupling agent.

The precursors of the present invention can form thin films having no or a little defect and having a good heat resistance by the LB method, and can provide thin films having a further improved heat resistance by partially or completely ring-closing the precursor thin film into a copolymeric polyimide.

Methods for ring-closure, namely forming a five-membered ring or a six-membered ring such as imidizing are not particularly limited, but heating at a temperature of about 200° to about 500° C. is general. The ring closure can also be conducted by using laser lights. Of course, the ring-closure can be conducted by using acetic anhydride or pyridine used in the imidizing of polyamide acid or by using the above compound with heating.

Polyimides are produced from the precursors of the invention, for instance, according to the following reaction schemes with respect to the precursors (6), (7), (8) and (9).

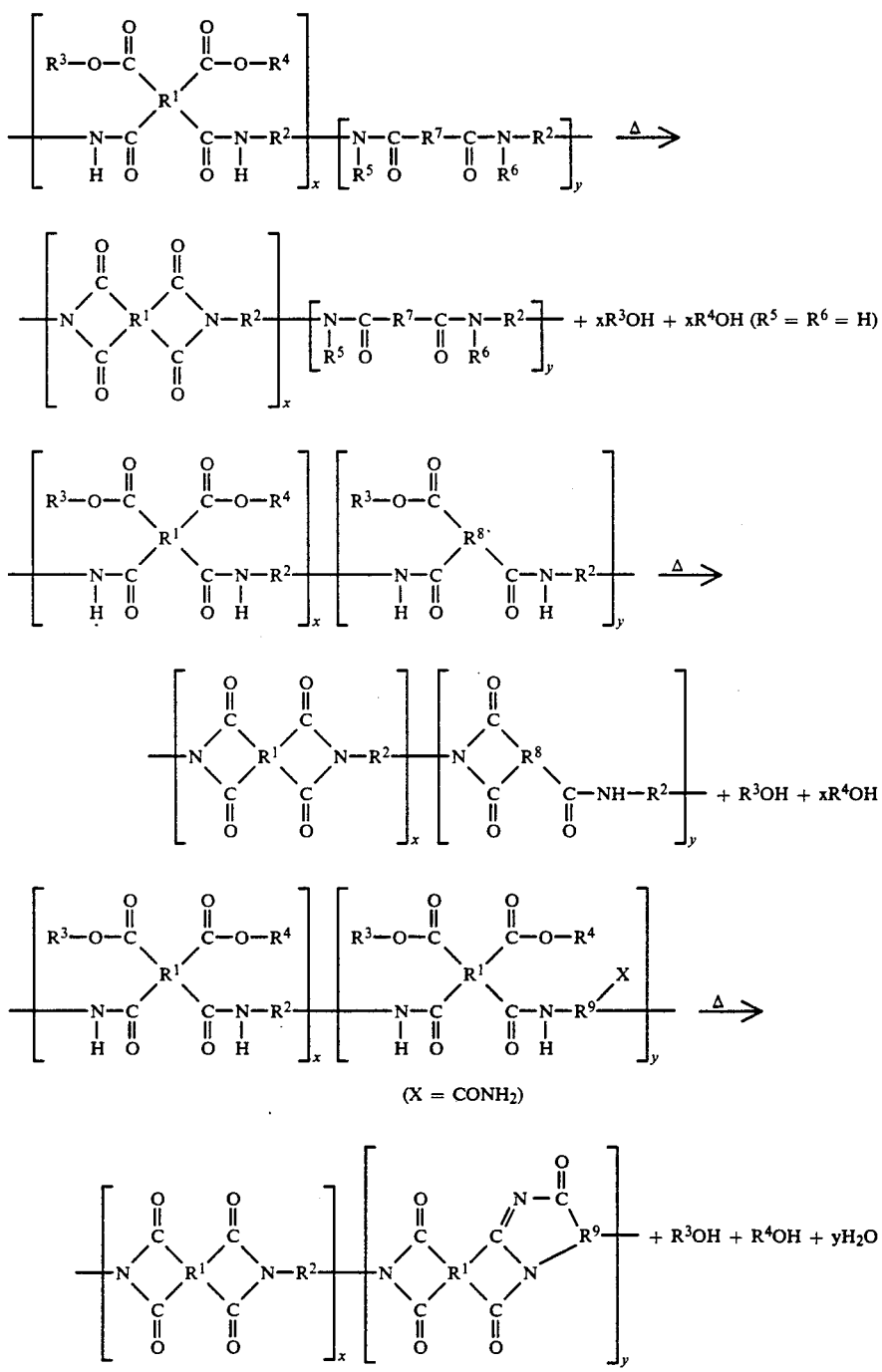

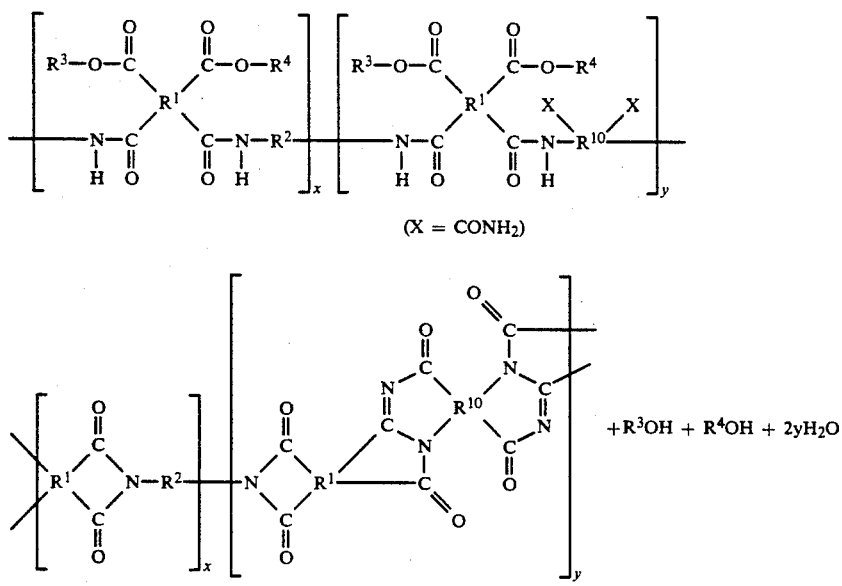

wherein x and y are as defined above.

Particularly, the latter two structures are preferable since a skelton with good heat resistance is introduced into the recurring unit. Of course, the polyamide acid represented by the formula (24) can be converted into polyimide with formation of $H_2O$, but this polyamide acid (24) is not usable as a material for forming LB films.

When the imidizing or other ring closure is carried out, the groups introduced for imparting the hydrophobic property to a polyamide acid eliminate in the form of an alcohol. Since the eliminated alcohol can be scattered away by conducting the ring closure in a gas stream or under vacuum at a temperature of about 200° to about 500° C., copolymeric polyimide films having excellent heat resistance and electric insulation property can be obtained.

While the area-time curve clearly reveals that the copolymeric and amphiphilic polyimide precursors of the present invention form ideal Y-type films by the LB method (vertical depping method), the linearity of the relationship between the inverse capacitance (1/C) and the number of layers (M) in the built-up film suggests that a layer structure expected to LB films is present in the built-up films of the copolymeric and amphiphilic polyimide precursors of the present invention. Also, the thin films of the precursors of the invention have good heat resistance, dielectric characteristics and electric insulation properties as well as an excellent controllability of film thickness. Therefore, the LB films of the precursors can be directly used for the various purposes such as electronic devices.

The copolymeric polyimide thin films obtained from the precursors of the present invention have excellent heat resistance and chemical resistance and good mechanical properties. The thin film of the present invention is more excellent in heat resistance than known polyimide thin films formed from polyimide homopolymers previously proposed by us. Because of the linearity of the relationship between 1/C and the number of layers, the built-up film retains its excellent thickness controllability even after conversion into copolymeric polyimide, thus it is possible to control the thickness of copolymeric polyimide thin films on the basis of the number of layers in the built-up films of the precursors. Furthermore, it is assumed that a layer structure is present in the copolymeric polyimide thin films, and also it has been made clear that the copolymeric polyimide thin films prepared according to the present invention have excellent dielectric characteristics and electric insulation properties.

In particular, according to the present invention, it is possible to provide the copolymeric polyimide thin films which have a high dielectric strength of not less than $1 \times 10^6$ V/cm even if the thickness is less than 1,000 Å. The copolymeric polyimide thin films have a heat resistance of more than 400° C., and some films among them have a heat resistance of more than 450° C. The films with a thickness of about 10,000 Å having good physical properties can be realized by the LB method, but when the preparation cost is taken into consideration, the thinner, the more inexpensive, and also from the viewpoint of utilization, thin films which cannot be prepared by other methods are of interest. That is to say, films having a thickness of not more than 2,000 Å, especially films having a thickness of not more than 1,000 Å or of several hundreds of angstroms or films having a thickness of 5 to 100 Å, have a possibility of new interesting applications. However, it has hitherto been difficult to realize a dielectric strength of not less than $1 \times 10^6$ V/cm with such a film thickness. According to the present invention, there can be provided copolymeric polyimide thin films having a dielectric strength of not less than $1 \times 10^6$ V/cm which can be sufficiently utilized in the electronic field. In particular, in case of the films having a thickness of about 50 Å to several hundreds of angstroms, unique effects produced by film thickness, e.g. tunnel effect, are expected, and many attractive applications utilizing them become possible.

Such a thin polyimide film can also be formed by spin coating or vapor deposition, but a highly skilled technique is required in achieving a dielectric strength of not less than $1 \times 10^6$ V/cm even with a thickness of more than 1 μm. Accordingly, it is to be understood that by the existing techniques, it is difficult to form copolymeric polyimide thin films with a thickness of not more than 1,000 Å having a dielectric strength of not less than $1\times10^6$ V/cm as obtained by the present invention.

Further, thin films obtained by partial conversion into polyimide under mild conditions rather than complete conversion also have a good heat resistance of more than 200° C. and excellent chemical resistance, mechanical strength and electric insulating properties. The partially converted films are of course very thin films with a thickness of not more than 10,000 Å, and it is possible to provide films having a thickness, e.g. 5,000 Å, 2,000 Å or 10 to 1,000 Å. Although the partially converted films are inferior in heat resistance to the complete polyimide films, but the electric insulation and dielectric characteristics thereof are rather superior to the complete polyimide films because the long chain alkyl groups remain.

By utilizing the above-mentioned excellent properties, e.g. heat resistance, chemical resistance, mechanical characteristics and electric insulation properties, and the film thickness of not more than 10,000 Å, e.g. from 5 to 1,000 Å, the thin films of the present invention can be used in various fields of art such as electronics, energy conversion and material separation.

For instance, by utilizing electric conductivity, photo-conductivity, optical property, insulating property, thermal property and chemical reactivity, the thin films obtained according to the present invention are usable as optical recording film, resist film, insulation film, thin film for capacitors, liquid crystal orientation film, polarization film, and sensor film. In particular, in case of the insulation film, the thin films of the invention are useful as insulation films for IC and LSI and can be used as insulation films in electric and electronic devices having MIS or MIM structure wherein various semiconductors and metals are combined with insulation films, e.g. field effect transistor, photoelectric device, light emitting device, light receiving device, light detecting device, and therminonic transistor. In particular, the thin films of the present invention are useful for use in MIS and MIM devices utilizing the tunnel effect and are usable as insulation films for JJ (Josephson junction).

In addition, it is also possible to utilize the precursors of the invention as cladding material for waveguide and a component for optical circuit.

Further, the precursors of the invention are suitable as protective coating materials in various fields. By utilizing the techniques for mixed films or assembled films of functional LB materials and fatty acids generally used in the field of LB films so as to use the precursors of the present invention instead of the fatty acids, various functionalities can be revealed and the uses utilizing them are considered. For instance, photoelectric devices and biosensors can be fabricated by forming films containing pigments or enzymes.

The present invention is more specifically described and explained by means of the following Examples. It is to be understood that the present invention is not limited to the Examples, and various changes and modifications may be made in the invention without departing from the spirit and scope thereof.

EXAMPLE 1

A flask was charged with 2.18 g (0.01 mole) of pyromellitic dianhydride (benzene-1,2,4,5-tetracarboxylic dianhydride) and 5.40 g (0.02 mole) of stearyl alcohol, and they were reacted about 100° C. for 3 hours in a dry nitrogen stream.

There was dissolved 3.80 g (5 mmole) of distearyl pyromellitate in 50 ml of hexamethylphosphoramide, to which 1.19 g (10 mmole) of thionyl chloride was added dropwise, and the mixture was reacted at 40° C. for 1 hour. To the reaction mixture was then added dropwise a solution of 0.9 g (4.5 mmole) of diaminodiphenyl ether and 0.075 g (0.5 mmole) of 2,5-diaminobenzamide dissolved in 30 ml of dimethylacetamide at about 5° C. and the reaction was continued at 5° C. for 1 hour, then at room temperature for 1 hour, and finally at 40° C. for 15 minutes. The homogeneous reaction mixture was poured into 600 ml of ethanol to precipitate the reaction product. The precipitate was filtered and dried under reduced pressure at about 40° C. to give about 3.6 g of a light yellow powder.

IR absorption analysis, thermal analysis (TGA and DTA), and measurement of molecular weight by gel permeation chromatography (GPC) were made with respect to the obtained powder.

IR absorption analysis

IR spectrum of the product measured by KBr disk method is shown in FIG. 1. Characteristic absorptions of ester, amido I, II and III absorption bands, alkyl chain and ether are observed in the spectrum. A broad absorption (non-association) of amide group ($-CONH_2$) in 2,5-diaminobenzamide was observed at from 1670 to 1700 cm$^{-1}$ in the copolymer obtained in Example 1.

Thermal analysis

Figure 2:
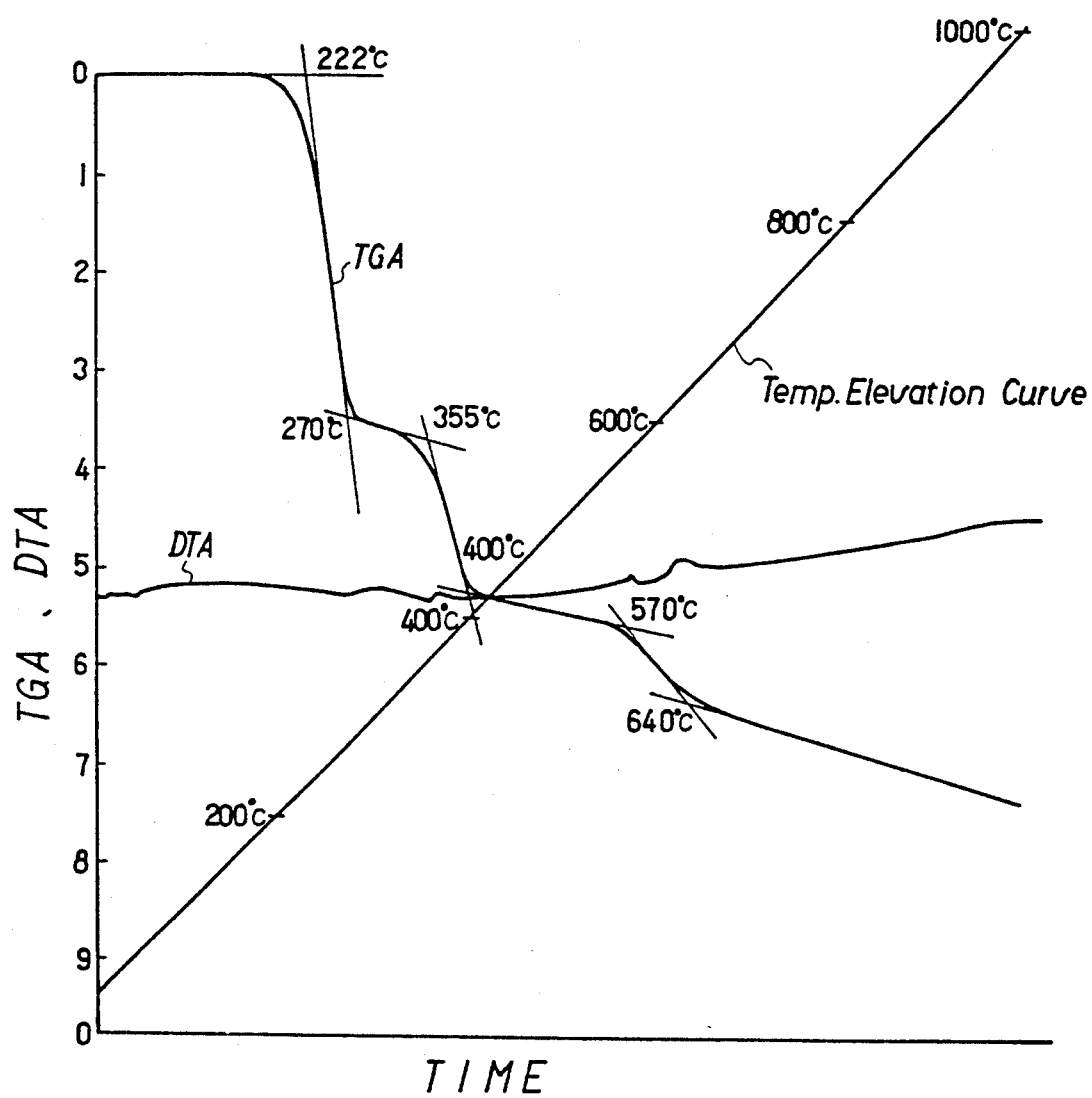
FIG. 2 is a graph showing the result of thermal analysis (thermogravimetric analysis-differential thermal analysis) of the precursor obtained in Example 1.

The results of thermal analysis measured by an RTG-DTA(H) type analyzer made by Rigaku Denki Kabushiki Kaisha with full scale 10 mg for TGA (thermogravimetric analysis) and 100 uV for DTA (differential thermal analysis) by elevating the temperature at a rate of 10° C./minute to 1,000° C. in a nitrogen stream (30 ml/minute) are shown in FIG. 2.

Figure 3:
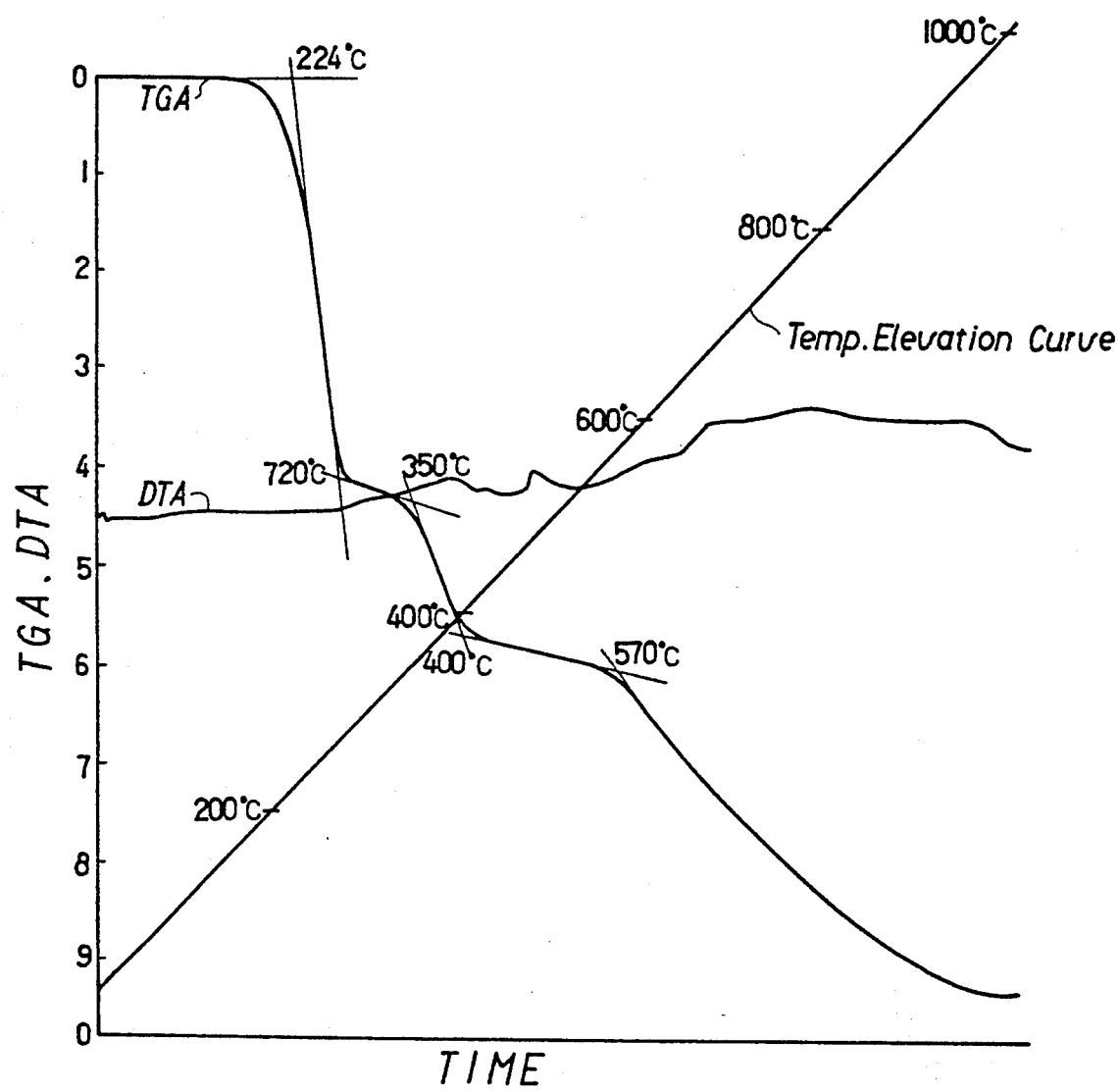
FIG. 3 is a graph showing the results of thermal analysis (TGA-DTA) of the precursor having no 2,5-diaminobenzamide.

In the TGA curve, inflection points are observed at 222° C., 270° C., 355° C., 400° C., 570° C. and 640° C. In the DTA curve, a peak is observed in the neighborhood of 640° C. The obtained copolymer showed the same behaviors as an amphiphilic polyimide precursor having no 2,5-diaminobenzamide (FIG. 3) and the cyclic reaction was completed at 400° C.

The thermal analysis (TGA and DTA) of the copolymer was also conducted by (1) raising the temperature to 400° C. at a rate of 10° C./minute, (2) maintaining the temperature at 400° C. for 30 minutes, (3) raising the temperature to 450° C. at a rate of 10° C./minute and maintaining the temperature at 450° C. for 30 minutes, (4) raising the temperature to 500° C. at a rate of 10° C./minute and maintaining the temperature at 500° C. for 30 minutes, (5) raising the temperature to 550° C. at a rate of 10° C./minute and maintaining the temperature at 550° C. for 30 minutes, and (6) raising the temperature to 600° C. at a rate of 10° C./minute and maintaining the temperature at 600° C. for 30 minutes.

It was observed that there was no remarkable weight loss at 400° C., 450° C. and 500° C., but the weight loss of 10% occured by maintaining at the temperature of 550° C. for 30 minutes.

Measurement of molecular weight by GPC

The number average molecular weight of the product measured by using a chloroform/N,N-dimethylacetamide mixed solvent in a volume ratio of 8:2 was about 25,000 (calculated in terms of polystyrene).

COMPARATIVE EXAMPLE 1

The thermal analysis (TGA and DTA) of the amphiphilic polyimide precursor having no 2,5-diaminobenzamide was carried out in the same manner as in Example 1. The results showed approximately the same behavior as those of the copolymer obtained in Example 1 by the temperature of 500° C., but the weight loss of 15% occured by maintaining the temperature of 550° C. for 30 minutes.

Therefore, it is obvious that the heat resistance of the copolymer of the present invention is improved in comparison with the amphiphilic precursor having no 2,5-diaminobenzamide.

EXAMPLE 2

In a distilled chloroform/dimethylacetamide mixed solvent in a volume ratio of 8:2 was dissolved in 55.1 mg of the product obtained in Example 1 to give 25 ml of a solution of the precursor to be used for forming the LB film.

The obtained solution was spread onto the surface of bidistilled water, and the relationship between the surface pressure ($\pi$) and the area per recurring unit (unit) was measured at 20° C. The surface pressure suddenly increased from about 75 Å$^2$/unit and a good condensed film was formed. The limiting area was 60 Å$^2$/unit, and the collapse pressure was 55 dyne/cm which was very high for a polymer film.

A built-up film of 15 layers was formed on an aluminum evaporated glass substrate according to the LB method at a speed of 10 mm/minute, while maintaining the surface pressure of the monolayer on the water surface at 25 dyne/cm at 20° C. It was confirmed that the built-up film was a Y-type film from the area-time curve.

With respect to the product of Example 1, it is also confirmed by IR absorption analysis, etc. that weight loss of 60% occurs by heating at 400° C. for 1 hour, and cyclic reaction completed. This weight loss well agrees to the value calculated supposing that stearyl alcohol and water are eliminated through the cyclic reaction. The calculated value is 59.2%.

COMPARATIVE EXAMPLE 2

Precursor was prepared in the same manner as in Example 1 using 3.80 g (5 mmole) of distearyl pyromellitate, 1.19 g (10 mmole) of thionyl chloride and 0.756 g (5 mmole) of 2,5-diaminobenzamide to give about 3.6 g of light yellow powder.

IR absorption analysis, $^1$HNMR analysis, thermal analysis (TGA and DTA) and measurement of molecular weight by GPC were made with respect to the obtained powder.

IR absorption analysis

Figure 4:
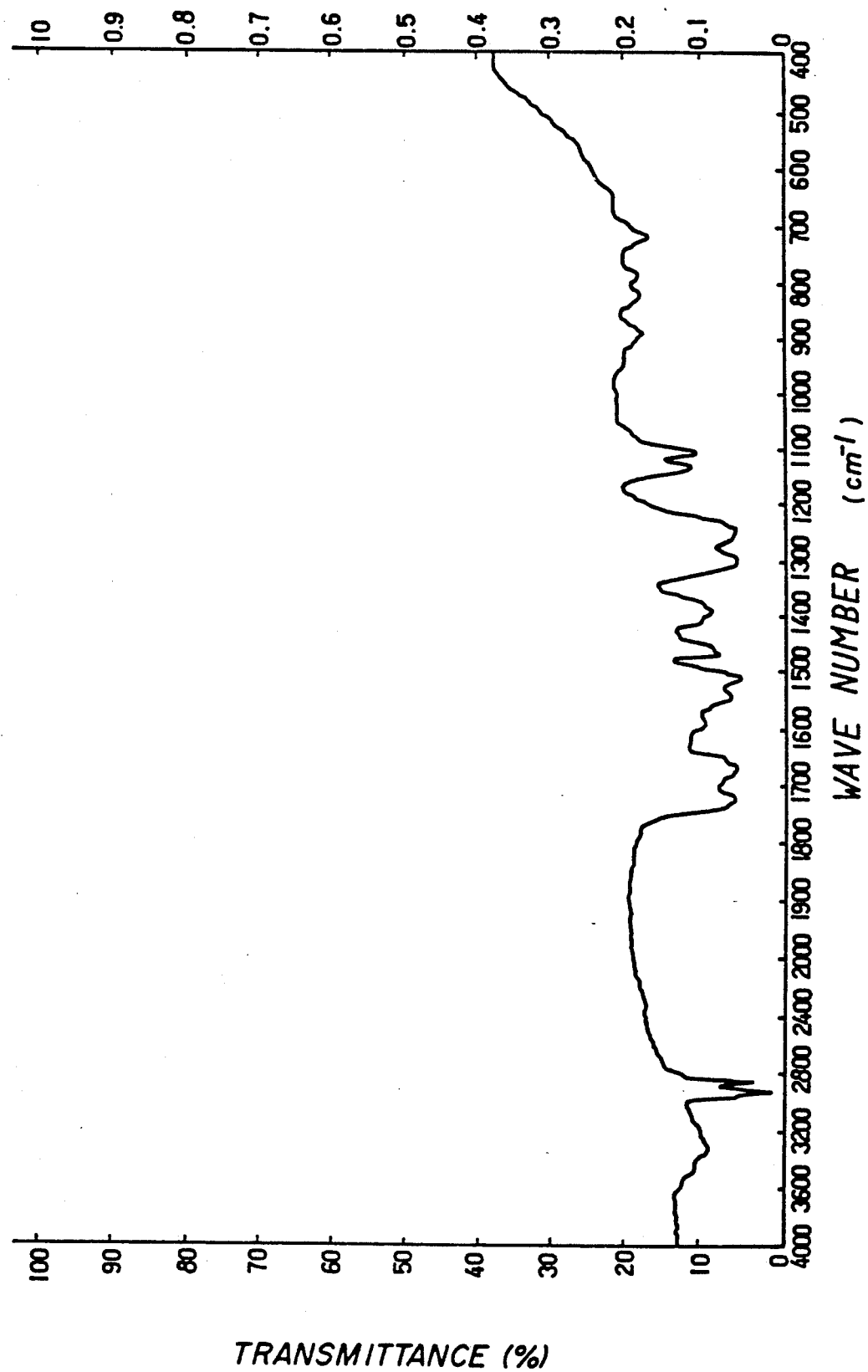
FIG. 4 is IR absorption spectrum of the precursor obtained in Comparative Example 2 described after.

IR spectrum of the product measured by KBr disk method is shown in FIG. 4. Characteristic absorptions of ester, amide I, II, and III absorption bands, alkyl chain and ether are observed in the spectrum. An absorption of amide group (—CONH2) in 2,5-diaminobenzamide was observed at from 1670 to 1700 cm$^{-1}$ in the precursor obtained in Example 2.

$^1$H NMR analysis

Figure 5:
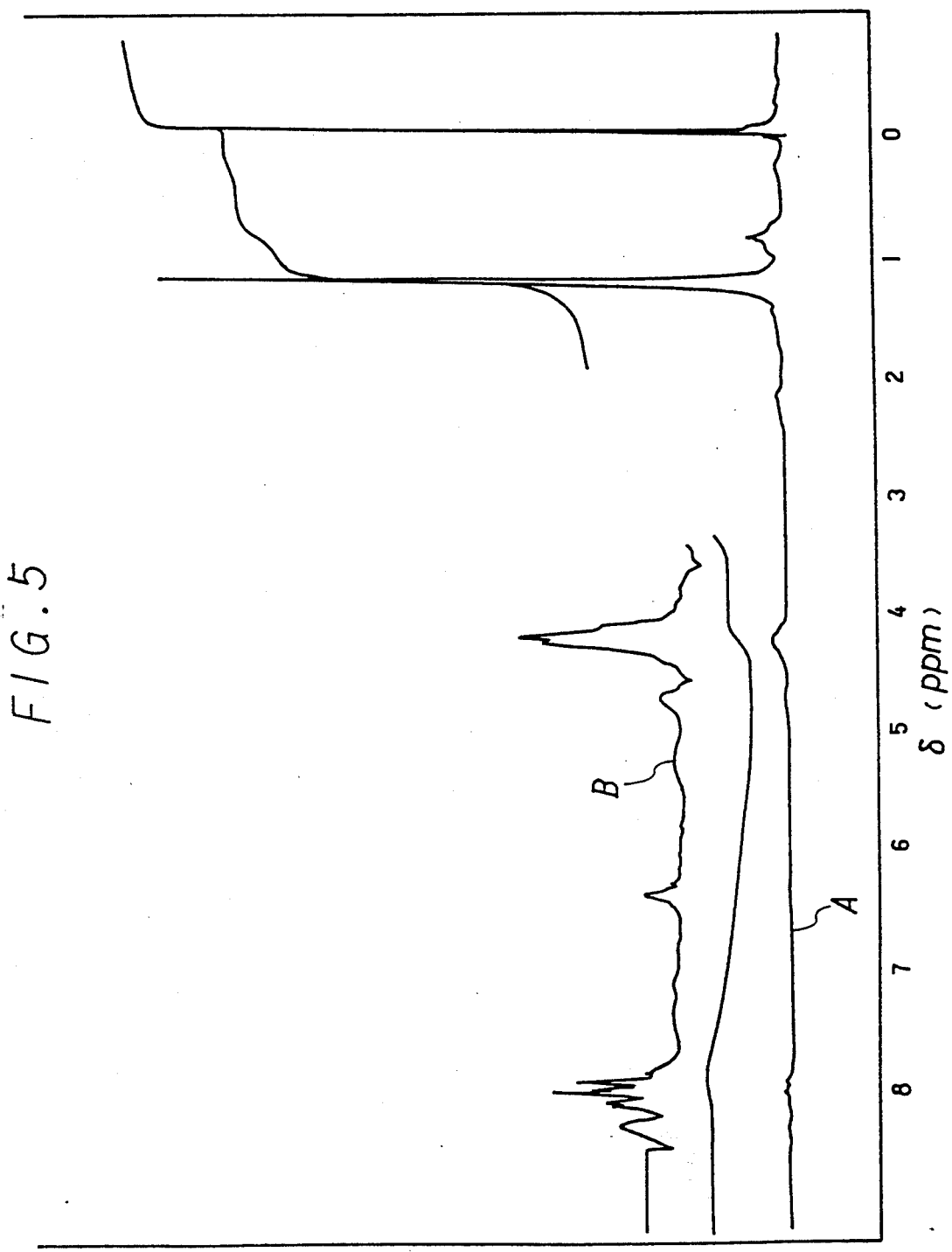
FIG. 5 is a graph showing the results of ¹H nuclear magnetic resonance (hereinafter referred to as "¹H NMR") of the precursor obtained in Comparative Example 2.

The $^1$H NMR analysis was conducted by using a mixed solvent of DMF-d and CDCl$_3$ under the condition of a frequency of 80 MHz. The results are shown in FIG. 5 wherein the line B is magnified the line A ten times in a vertical axis direction. Peaks were observed at $\delta$ values, 1.2 (CO$_2$CH$_2$C$_{17}$H$_{35}$), 4.3 (CO$_2$CH$_2$C$_{17}$H$_{35}$) and 7.70–8.40 (aromatic).

Thermal analysis

Figure 6:
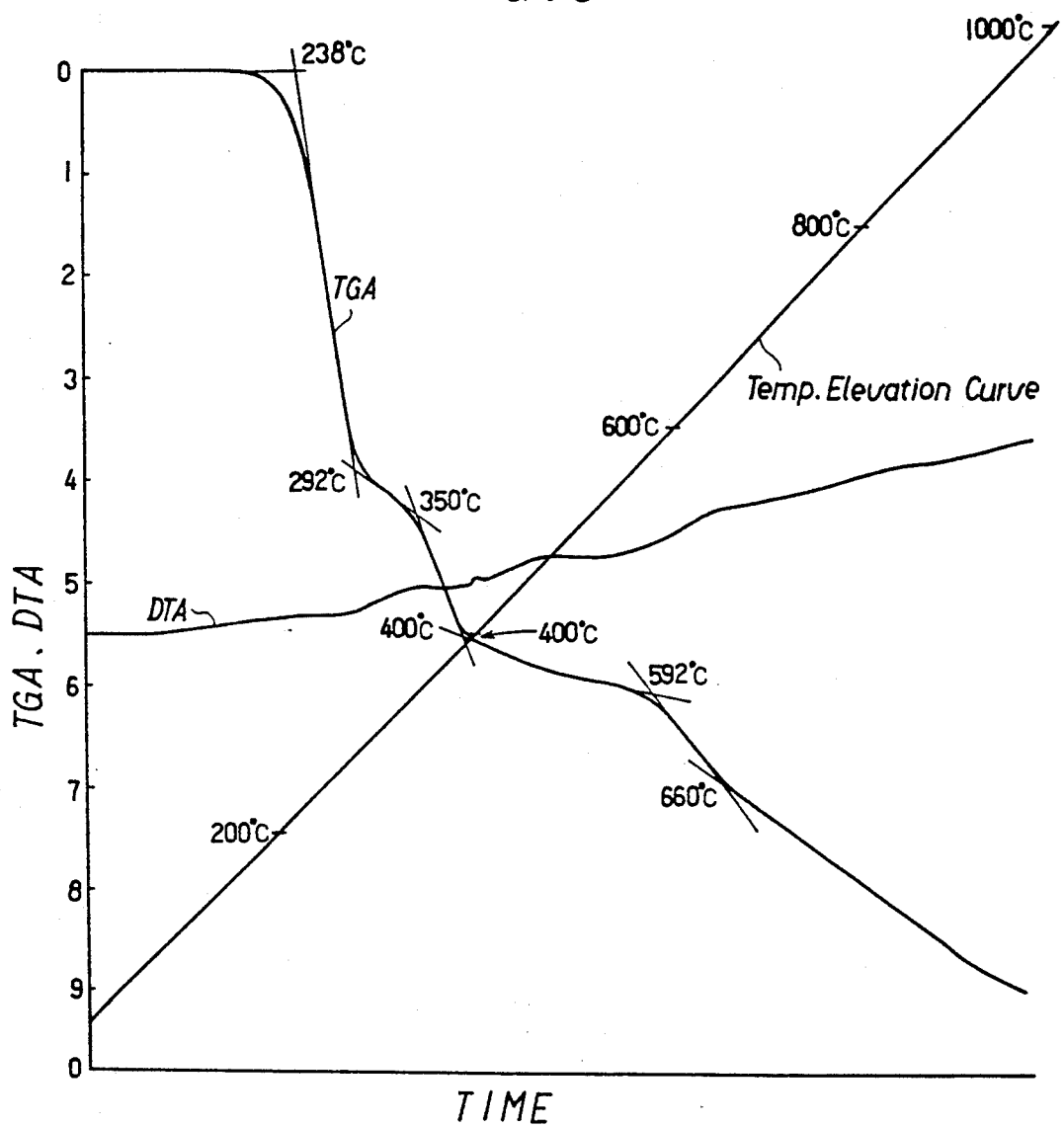
FIG. 6 is a graph showing the results of thermal analysis of the precursor obtained in Comparative Example 2.

Thermal analysis (TGA and DTA) were conducted in the same manner as in Example 1. The results are shown in FIG. 6.

In the TGA curve, inflection points are observed at 238° C., 292° C., 350° C., 400° C., 592° C. and 660° C. In the DTA curve, a characteristic peak is not observed. The behavior of the thermal analysis of the precursor is similar to those of the copolymer obtained in Example 1. Also, it is comfirmed that the cyclic reaction was completed at 500° C. from the result of the weight loss of 65% occured by heating at the temperature of 500° C. for 1 hour and of IR absorption analysis.

Measurement of molecular weight by GPC

The number average molecular weight of the product measured in the same manner as in Example 1. The copolymer had the number molecular weight of 20,000 (calculated in terms of polystyrene).

COMPARATIVE EXAMPLE 3

The solution of the precursor to be used for forming the LB film was prepared in the same manner as in Example 2 except that the produce obtained in Comparative Example 2 was used.

The obtained solution was spread onto the surface of bidistilled water, and the relationship between the surface pressure ($\pi$) and the area per recurring unit (unit) was measured at 20° C. The surface pressure suddenly increased from about 80 and a good condensed film was formed. The limiting area was 65 Å$^2$/unit, and the collapse pressure was 45 dyne/cm which was very high for a polymer film.

A build-up film of 15 layers of the mixture of the product obtained in Comparative Example 2 and stearyl alcohol in a molecular ratio of 1:1 was formed on Al evaporated glass substrate according to the LB method at a speed of 10 mm/minute, while maintaining the surface pressure of the monolayer on the water surface at 25 dyne/cm at 20° C. It was confirmed that the built-up film was a Y-type film from the area-time curve.

EXAMPLE 3

Figure 7:
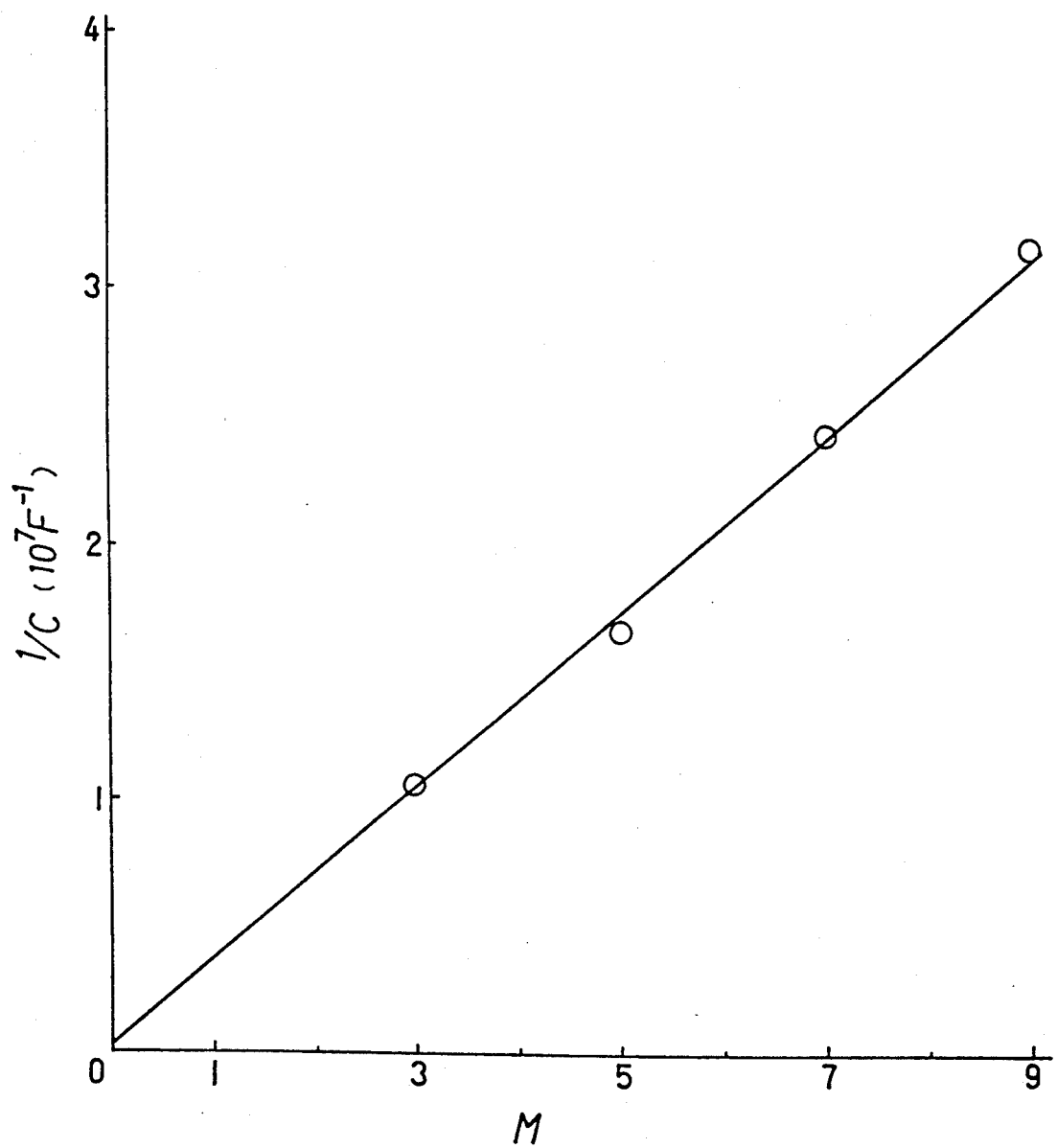
FIG. 7 is a graph showing the relationship between the inverse capacitance (1/c) of MIM devices prepared from a built-up film obtained in Example 3 and the number of layers (M) in the built-up film.

Built-up films of 3,5,7 and 9 layers of a mixture of the product obtained in Example 1 and stearyl alcohol in a molecular ratio of 1:1 were formed on glass substrates treated with a silane coupling agent A-1100 (commercially available from Union Carbide Corp.) each having an aluminum electrode of about 6 mm in width according to the LB method in the same manner as in Comparative Example 3. MIM devices having a device area of 0.18 cm$^2$ were prepared by forming the above built-up films on the treated substrate having the aluminum electrode, and depositing aluminum on the surface of the film to form an upper Al electrode crossing at right angles with respect to the lower Al electrode. The capacitance was measured at room temperature and at a frequency of 120 Hz, and the inverse capacitance values (1/C) were plotted with respect to the number of layers (M). The result is shown in FIG. 7. As shown in FIG. 7, the relationship between 1/C and M is excellent.

With respect to a monomolecular film of the product obtained in Example 1 having a thickness of about 27 Å, there was applied an electric field of not less than $1 \times 10^6$ V/cm, but no dielectric breakdown occurred.

EXAMPLE 4

Figure 8:
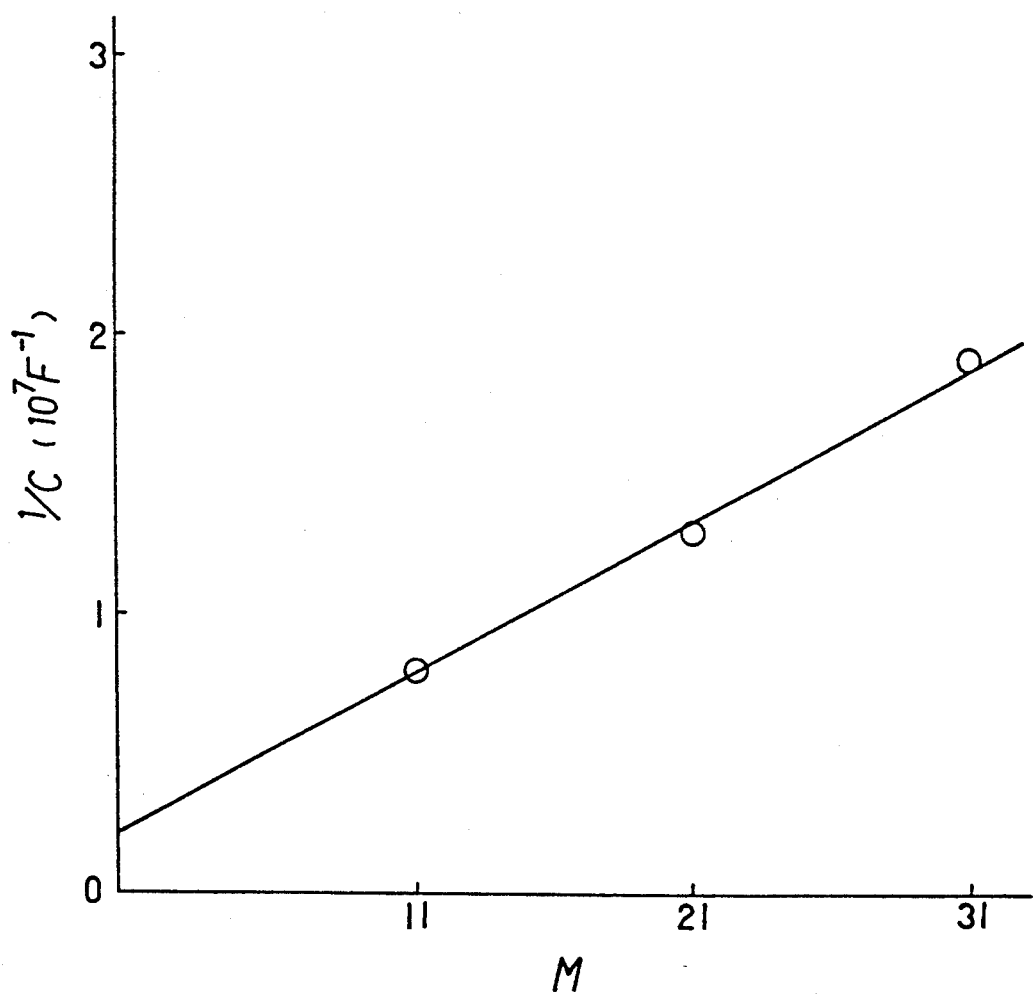
FIG. 8 is a graph showing the relationship between the inverse capacitance (1/c) of Al/copolymeric polyimide thin film/A; devices prepared from a built-up film obtained in Example 4 and the number of layers (M) in the built-up film.

Built-up films of 11, 21 and 31 layers were prepared in the same manner as in Example 3. Al/copolymeric polyimide thin film/Al devices having a device area of 0.18 cm² were prepared by forming the above built-up films, heating the obtained built-up films in a nitrogen stream at 400° C. for 1 hour and forming an upper aluminum electrode on each of the films. The capacitance was measured in the same manner as in Example 3, and the inverse capacitance values (1/C) were plotted with respect to the number of layers (M). The result is shown in FIG. 8. As shown in FIG. 8, the relationship between 1/C and M is excellent.

With respect to a monomolecular film of the copolymeric polyimide of Example 4 having a thickness of 5 Å, there was applied an electric field of not less than $1 \times 10^6$ V/cm, but no dielectric breakdown occured.

EXAMPLE 5

There was dissolved 3.80 g (5 mmole) of distearyl pyromellitate in 50 ml of hexamethylphosphoramide, to which 1.19 g (10 mmole) of thionyl chloride was added dropwise, and the mixture was reacted at 40° C. for 1 hour. To the reaction mixture was then added dropwise a solution of 0.9 g (4.5 mmole) of diaminodiphenyl ether and 0.097 g (0.5 mmole) of 2,5-diaminoterephthalamide dissolved in 50 ml of dimethylacetamide at about 5° C. and the reaction was continued at 5° C. for 1 hour, then at room temperature for 1 hour, and finally at 60° C. for 15 minutes. The homogeneous reaction mixture was poured into 600 ml of ethanol to precipitate the reaction product. The precipitate was filtered and dried under reduced pressure at about 40° C. to give about 2.9 g of a light yellow powder.

IR absorption analysis, thermal analysis (TGA and DTA), and measurement of molecular weight by GPC were made with respect to the obtained powder.

IR absorption analysis

Figure 9:
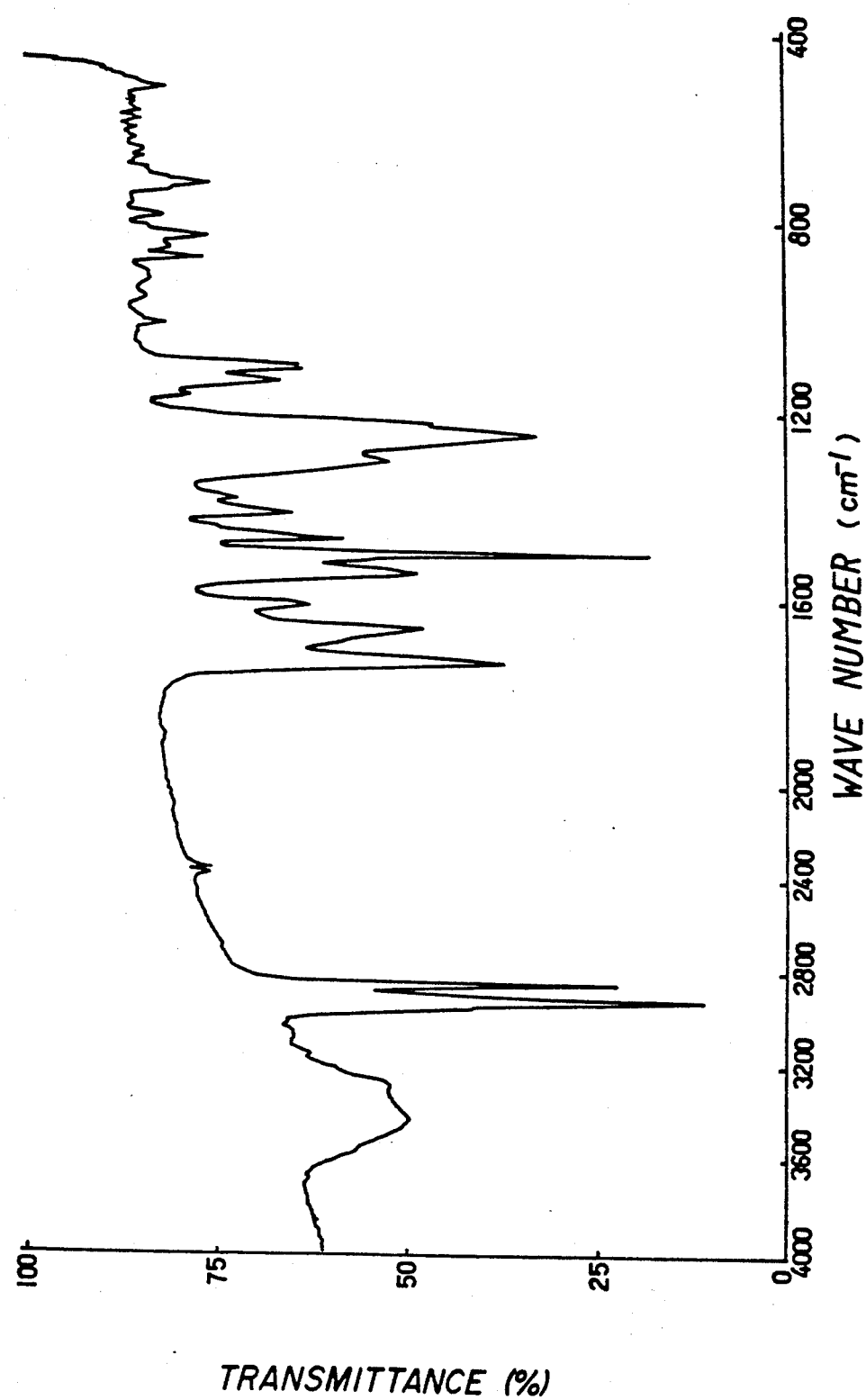
FIG. 9 is an IR absorption spectrum of the precursor obtained in Example 5 described after.

IR spectrum of the product measured by KBr disk method is shown in FIG. 9. Characteristic absorptions of ester, amido I, II and III absorption bands, alkyl chain and ether are observed in the spectrum alike the polyimide precursor previously proposed by us. However, an absorptions of amido I and II (—CONH$_2$) were observed at 1680 and 1635 cm$^{-1}$ according to a difference spectrum of the copolymer obtained in Example 5 and the polyimide precursor previously proposed by us.

Thermal analysis

Figure 10:
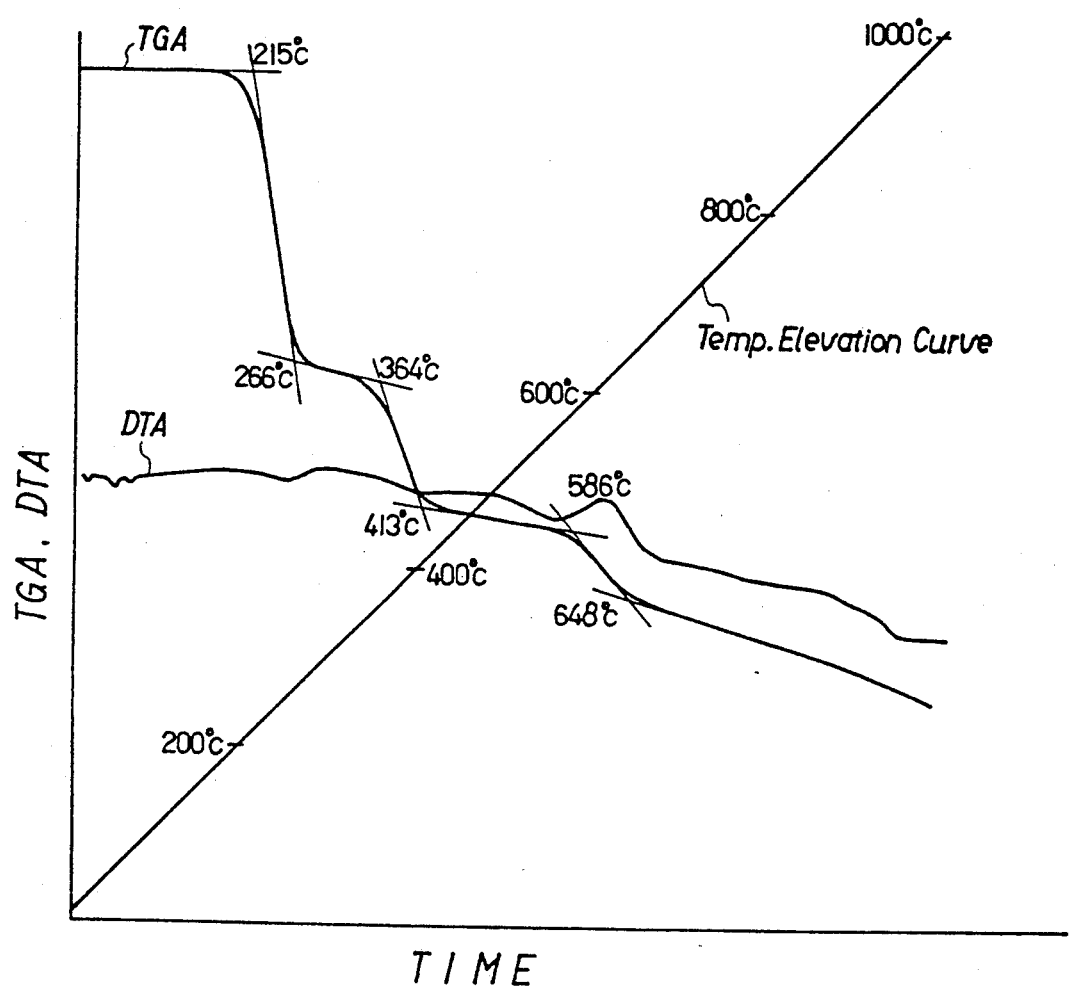
FIG. 10 is a graph showing the results of thermal analysis (TGA-DTA) of the precursor obtained in Example 5.

The thermal analysis (TGA and DTA) were conducted by the RTG-DTA(H) type analyzer with full scale 10 mg for TGA and 100 uV for DTA by elevating the temperature at a rate of 10° C./minute to 1,000° C. in a nitrogen stream (30 ml/minute). The results are shown in FIG. 10.

In the TGA curve, inflection points are observed at 215° C., 266° C., 364° C., 413° C., 586° C. and 648° C. In the DTA curve, a peak is observed in the neighborhood of 620° C. The obtained copolymer showed the similar behaviors as an amphiphilic polyimide precursor having no 2,5-diaminoterephthalamide (FIG. 3) and the cyclic reaction was completed at about 450° C.

The thermal analysis (TGA and DTA) of the copolymer was also conducted by (1) raising the temperature to 400° C. at a rate of 10° C./minute, (2) maintaining the temperature at 400° C. for 30 minutes, (3) raising the temperature to 450° C. at a rate of 10° C./minute and maintaining the temperature at 450° C. for 30 minutes, (4) raising the temperature to 500° C. at a rate of 10° C./minute and maintaining the temperature at 500° C. for 30 minutes, (5) raising the temperature to 550° C. at a rate of 10° C./minute and maintaining the temperature at 550° C. for 30 minutes, and (6) raising the temperature to 600° C. at a rate of 10° C./minute and maintaining the temperature at 600° C. for 30 minutes.

It was observed that there was no remarkable weight loss at 400° C., 450° C. and 500° C., but the weight loss of 10% occured by maintaining at the temperature of 550° C. for 30 minutes.

Therefore, it is obvious that the heat resistance of the copolymer of the present invention is improved in comparison with the amphiphilic precursor having no 2,5-diaminoterephthalamide.

Measurement of molecular weight by GPC

The number average molecular weight of the product measured in the same manner as in Example 1 was about 20,000 (calculated in terms of polystyrene).

EXAMPLE 6

In a distilled chloroform/dimethylacetamide mixed solvent in a volume ratio of 8:2 was dissolved in the product obtained in Example 5 to give a solution of the precursor to be used for forming the LB film.

Figure 11:
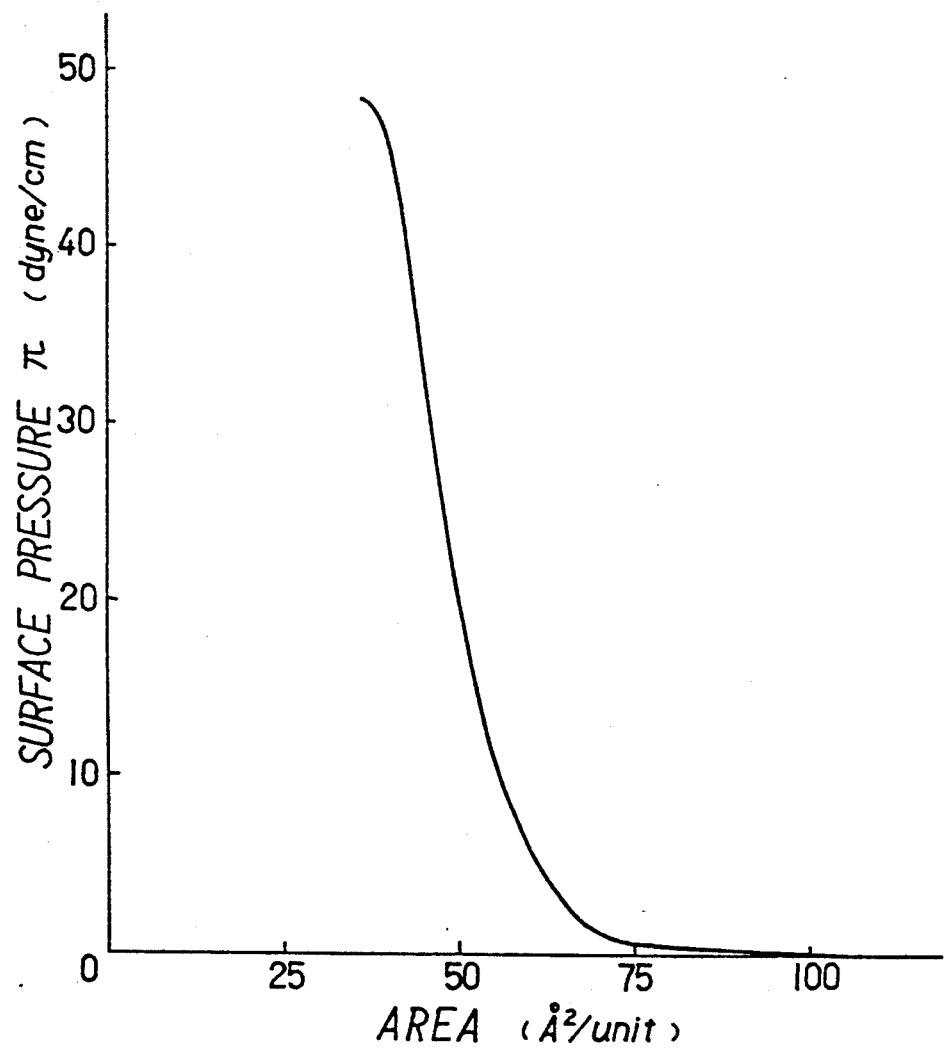
FIG. 11 is a graph showing the relationship between the surface pressure ($\pi$) and the area per recurring unit of the precursor obtained in Example 5.

The obtained solution was spread onto the surface of bidistilled water, and the relationship between the surface pressure ($\pi$) and the area per recurring unit (unit) was measured at 20° C. The relationship between the surface pressure ($\pi$) and the area per recurring unit (unit) is shown in FIG. 11. The surface pressure suddenly increased from about 75 and a good condensed film was formed. The limiting area was 57 Å²/unit, and the collapse pressure was 47 dyne/cm which was very high for a polymer film.

A built-up film could be formed on an aluminum evaporated glass substrate by using a mixture of the precursor and stearyl alcohol according to the LB method at a speed of 10 mm/minute, while maintaining the surface pressure of 25 dyne/cm at 20° C., and it was confirmed that the obtained built-up film was a Y-type film.

With respect to the product of Example 5, it is also confirmed by IR absorption analysis and difference spectrum that weight loss of 64% occurs by heating at 450° C. for 1 hour, and cyclic reaction completed.

EXAMPLE 7

Figure 12:
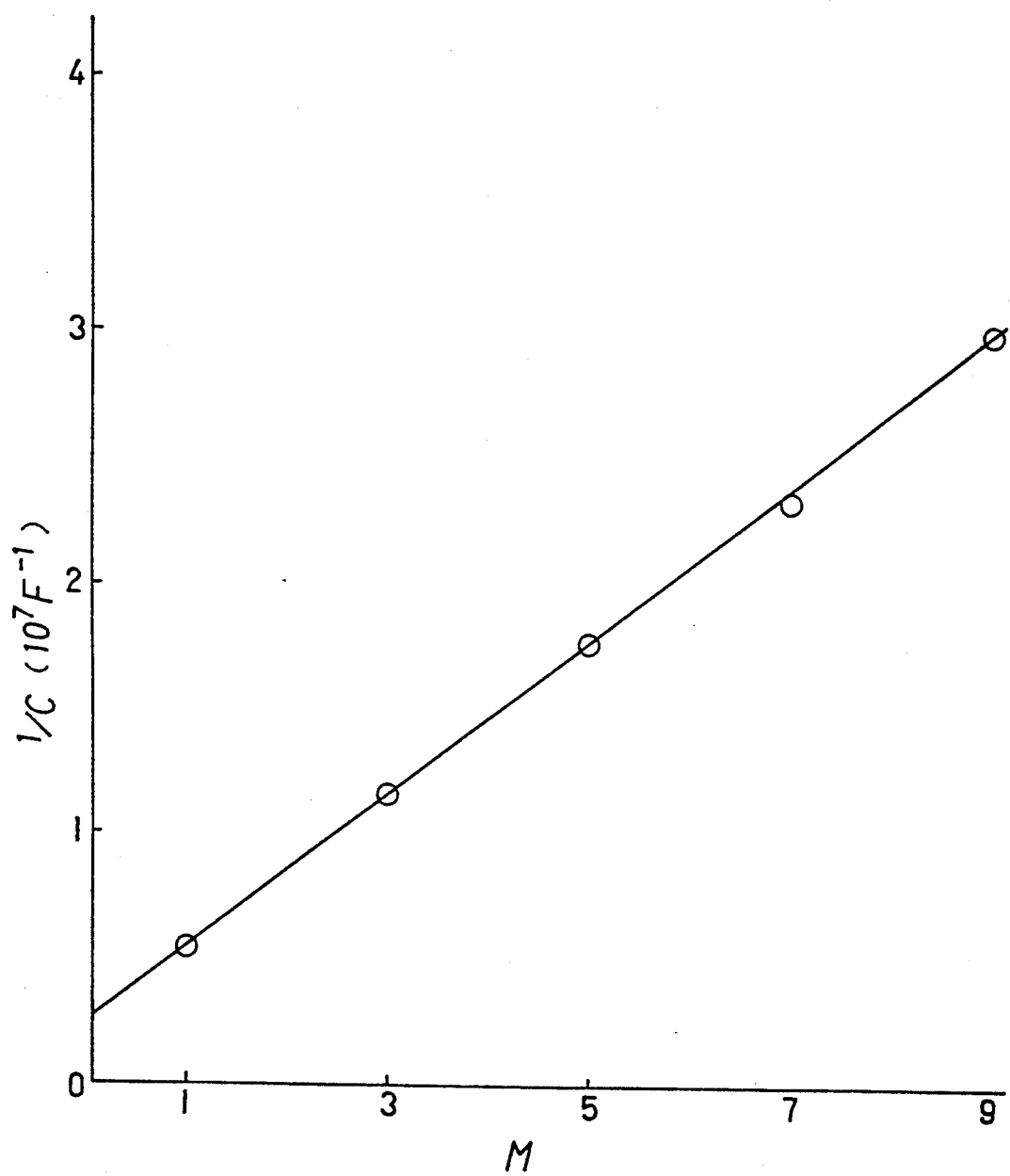
FIG. 12 is a graph showing the relationship between the inverse capacitance (1/c) of MIM devices prepared from a built-up film obtained in Example 7 and the number of layers (M) in the built-up film.

Built-up films of 1, 3, 5, 7 and 9 layers were formed in the same manner as in Example 3 except that a mixture of the product obtained in Example 5 and stearyl alcohol was used. MIM devices were prepared in the same manner as in Example 3 except that the built-up films of the mixture of the product obtained in Example 5 and stearyl alcohol were used. The capacitance was measured at room temperature and at a frequency of 120 Hz, and the inverse capacitance values (1/C) were plotted with respect to the number of layers (M). The result is shown in FIG. 12. As shown in FIG. 12, the relationship between 1/C and M is excellent.

With respect to a monomolecular film of the product obtained in Example 5 having a thickness of about 27 Å, there was applied an electric field of not less than $1 \times 10^6$ V/cm, but no dielectric breakdown occured.

EXAMPLE 8

Figure 13:
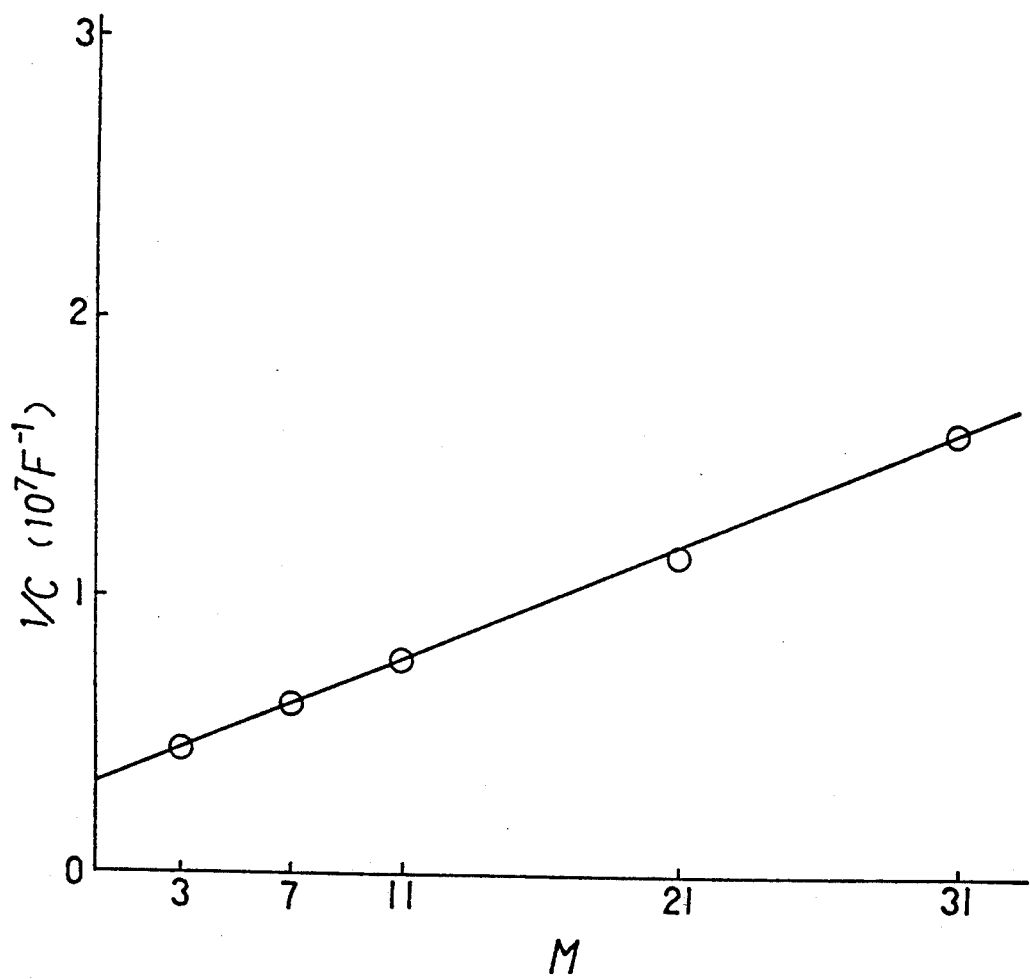
FIG. 13 is a graph showing the relationship between the inverse capacitance (1/c) of Al/copolymeric polyimide thin film/Al devices prepared from a built-up film obtained in Example 8 and the number of layers (M) in the built-up film.

Built-up films of 3, 7, 11, 21 and 31 layers were prepared in the same manner as in Example 7. Al/copolymeric polyimide thin film/Al devices having a device area of 0.18 cm$^2$ were prepared by forming the above built-up films, heating the films in a nitrogen stream at 450° C. for 1 hour and forming an upper aluminum electrode on each of the films. The capacitance was measured in the same manner as in Example 7, and the inverse capacitance values (1/C) were plotted with respect to the number of layers (M). The result is shown in FIG. 13. As shown FIG. 13, the relationship between 1/C and M is excellent.

With respect to a monomolecular film of the copolymeric polyimide of Example 8 having a thickness of 5 Å, there was applied an electric field of not less than $1 \times 10^6$ V/cm, but no dielectric breakdown occured.

The copolymeric and amphiphilic polyimide precursor of the present invention can provide thin films by the LB technique, and by ring closure such as imidizing of the obtained LB films, there can be obtained ultrathin films having excellent heat resistance, electric properties, chemical resistance and mechanical properties, and having a thickness of not more than 10,000 Å, and if desired, a thickness of 10 to 1,000 Å. Further, the process of the present invention has such an advantage that polyimide thin films having a wide range of properties can be easily prepared. When a part of the group R$^2$ in the precursor of the present invention are substituted with a trivalent or tetravalent group, the heat resistance of the precursor can be improved since a ring having better heat resistance than an imide ring is formed.

What we claim is:

1. A thin film comprising a copolymeric and amphiphilic polyimide precursor having the recurring unit of the formula (1):

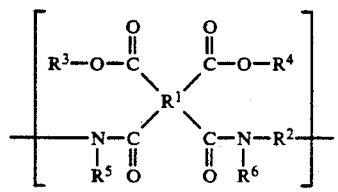

wherein R$^1$ is a tetravalent group having at least 2 carbon atoms, R$^2$ is a bivalent group having at least 2 carbon atoms, and each of R$^3$, R$^4$, R$^5$ and R$^6$ is independently a hydrogen atom or a monovalent group having 1 to 30 carbon atoms selected from the group consisting of: (i) an aliphatic group, (ii) an alicyclic group, (iii) an aromatic group, (iv) a group in which an aliphatic group is combined with an aromatic group or an alicyclic group, said groups (i-iv) being unsubstituted or substituted by a substituent selected from the group consisting of a halogen atom, a nitro group, an amino group, a cyano group, a methoxy group and an acetoxyl group, provided that at least one of R$^3$, R$^4$, R$^5$ and R$^6$ has at least 12 carbon atoms;

and at least one recurring unit selected from the group consisting of units of the formulas:

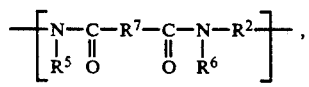

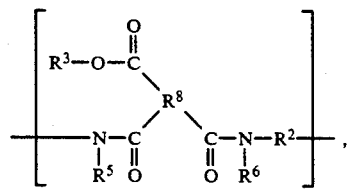

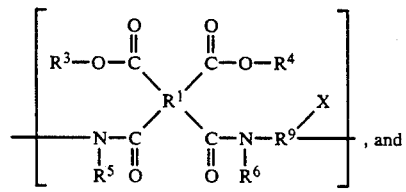, and

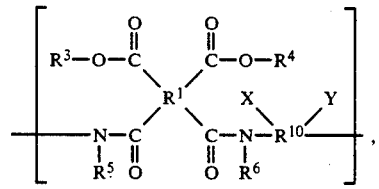

wherein R$^1$, R$^2$, R$^3$, R$^4$, R$^5$ and R$^6$ are as defined above, R$^7$ is a bivalent group having at least 2 carbon atoms, R$^8$ is a trivalent group having at least 2 carbon atoms, R$^9$ is a trivalent group having at least 2 carbon atoms, R$^{10}$ is a tetravalent group having at least 2 carbon atoms, each of X and Y is independently selected from the group consisting of —NHR', —CONHR' and —SO$_2$NHR' wherein R' is an alkyl group or hydrogen atom.

2. The thin film of claim 1, which has a dielectric breakdown strength of not less than $1 \times 10^6$ V/cm.

3. The thin film of claim 1, which is a built-up film formed according to Langmuir-Blodgett technique.

4. The thin film of claim 1, wherein said precursor is partially ring-closed.

5. The thin film of claim 3, which has a dielectric breakdown strength of not less than $1 \times 10^6$ V/cm.

6. The thin film of claim 4, which has a dielectric breakdown strength of not less than $1 \times 10^6$ V/cm and a heat resistance of more than 200° C.

7. The thin film of claim 4, wherein said precursor is formed on a substrate in a state of a multilayer film according to Langmuir-Blodgett technique and is partially subjected to ring closure.

8. A copolymeric polyimide thin film prepared by forming a film of a polyimide precursor and converting said polyimide precursor into the corresponding polyimide, wherein said polyimide precursor has the recurring unit of formula (1):

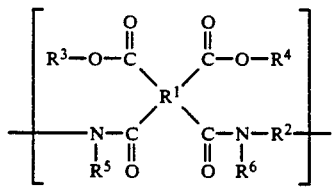

wherein R¹ is a tetravalent group having at least 2 carbon atoms, R² is a bivalent group having at least 2 carbon atoms, and each of R³, R⁴, R⁵ and R⁶ is independently a hydrogen atom or a monovalent group having 1 to 30 carbon atoms selected from the group consisting of: (i) an aliphatic group, (ii) an alicyclic group, (iii) an aromatic group, (iv) a group in which an aliphatic group is combined with an aromatic group or an alicyclic group, said groups (i-iv) being unsubstituted or substituted by a substituent selected from the group consisting of a halogen atom, a nitro group, an amino group, a cyano group, a methoxy group and an acetoxyl group, provided that at least one of R³, R⁴, R⁵ and R⁶ has at least 12 carbon atoms;

and at least one recurring unit selected from the group consisting of units of the formulas:

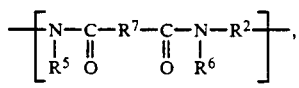

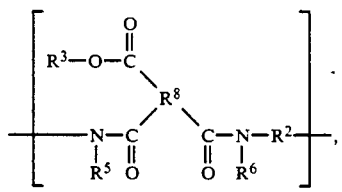

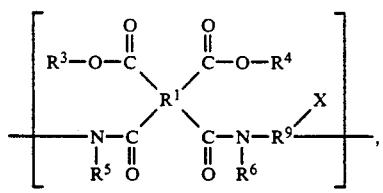

and

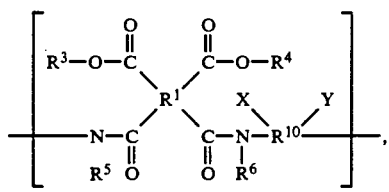

wherein R¹, R², R³, R⁴, R⁵ and R⁶ are as defined above, R⁷ is a bivalent group having at least 2 carbon atoms, R⁸ is a trivalent group having at least 2 carbon atoms, R⁹ is a trivalent group having at least 2 carbon atoms, R¹⁰ is a tetravalent group having at least 2 carbon atoms, each of X and Y is independently selected from the group consisting of —NHR', —CONHR' and —SO₂NHR' wherein R' is an alkyl group or hydrogen atom.

9. The thin film of claim 8, which has a thickness of not more than 1000 Å.

10. The thin film of claim 8, which has a dielectric breakdown of not less than 1×10⁶ V/cm.

11. The thin film of claim 8, which has a heat resistance of not less than 400° C.

12. The thin film of claim 11, which has a heat resistance of not less than 450° C.

13. The thin film of claim 10, wherein said precursor is formed on a substrate in a state of a multilayer film according to the Langmuir-Blodgett technique and is partially subjected to ring closure.

14. A copolymeric polyimide film comprising a polyimide selected from the group consisting of:

(1) a polyimide having the recurring unit of the formula

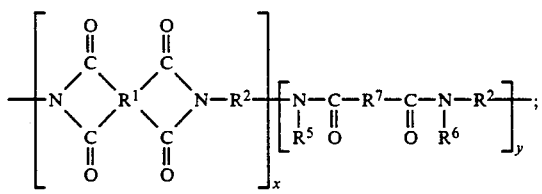

(2) a polyimide having the recurring unit of the formula

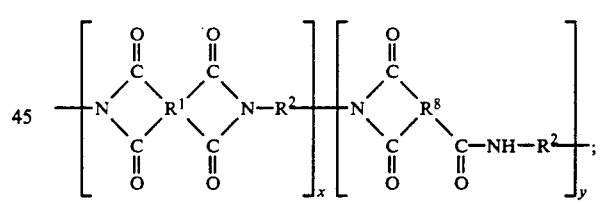

(3) a polyimide having the recurring unit of the formula

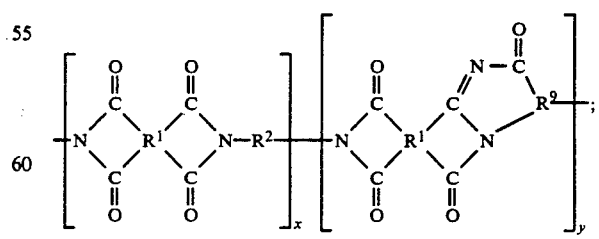

and (4) a polyimide having the recurring unit of the formula

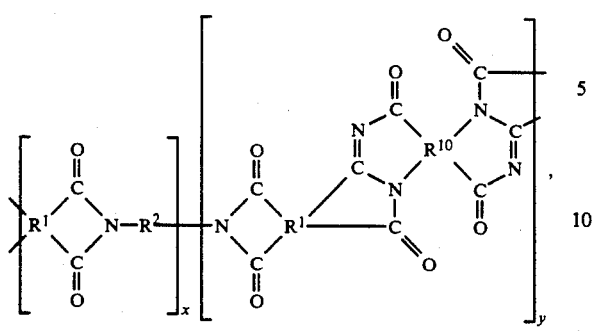

wherein R² is a tetravalent group having at least 2 carbon atoms, R² is a bivalent group having at least 2 carbon atoms, each of R⁵ and R⁶ is independently a hydrogen atom or a monovalent group having 1 to 30 carbon atoms selected from the group consisting of: (i) an aliphatic group, (ii) an alicyclic group, (iii) an aromatic group, (iv) a group in which an aliphatic group is combined with an aromatic group or an alicyclic group, said groups (i-iv) being unsubstituted or substituted by a substituent selected from the group consisting of a halogen atom, a nitro group, an amino group, a cyano group, a methoxy group and an acetoxyl group, $R^7$ is a bivalent group having at least 2 carbon atoms, $R^8$ is a trivalent group having at least 2 carbon atoms, $R^9$ is a trivalent group having at least 2 carbon atoms, $R^{10}$ is a tetravalent group having at least 2 carbon atoms, and x and y represent a ratio satisfying the equations $0<x<1$;

$0<y<1$; and $x+y=1$, wherein said copolymeric polyimide thin film has a thickness of not ore than 1000 Å and a dielectric constant breakdown of not less than $1 \times 10^6$ V/cm.

* * * * *